US012183104B2

(12) United States Patent
Fujimoto et al.

(10) Patent No.: US 12,183,104 B2
(45) Date of Patent: Dec. 31, 2024

(54) HANDWRITING RECOGNITION PIPELINES FOR GENEALOGICAL RECORDS

(71) Applicant: Ancestry.com Operations Inc., Lehi, UT (US)

(72) Inventors: Masaki Stanley Fujimoto, Provo, UT (US); Kalyan Chakravarthi Murahari, San Francisco, CA (US); Siteng Chen, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 346 days.

(21) Appl. No.: 17/867,390

(22) Filed: Jul. 18, 2022

(65) Prior Publication Data

US 2023/0010202 A1 Jan. 12, 2023

Related U.S. Application Data

(63) Continuation of application No. PCT/IB2022/056310, filed on Jul. 8, 2022.
(Continued)

(51) Int. Cl.
*G06V 30/412* (2022.01)
*G06N 3/044* (2023.01)
(Continued)

(52) U.S. Cl.
CPC .......... *G06V 30/412* (2022.01); *G06N 3/044* (2023.01); *G06N 3/063* (2013.01); *G06V 10/82* (2022.01)

(58) Field of Classification Search
CPC .... G06V 30/412; G06V 10/82; G06V 10/809; G06V 30/1801; G06V 30/18057;
(Continued)

(56) References Cited

U.S. PATENT DOCUMENTS 8,824,803 B2 9/2014 Reese et al.
9,767,353 B2 9/2017 Reese et al.
(Continued)

OTHER PUBLICATIONS

Couasnon, B. et al. "Access by Content to Handwritten Archive Documents: General Document Recognition Method and Platform for Annotations." International Journal of Document Analysis and Recognition (IJDAR), vol. 9, Mar. 24, 2007, pp. 223-242.
(Continued)

*Primary Examiner* — Michael S Osinski
(74) *Attorney, Agent, or Firm* — Fenwick & West LLP

(57) ABSTRACT

Disclosed herein relates to example embodiments for recognizing handwritten information in a genealogical record. A computing server may receive a genealogical record. The genealogical record may take the form of an image of a physical form having a structured layout, fields, and handwritten information. The computing server may divide the genealogical record into a plurality of areas based on the structured layout. The computing server may identify, for a particular area, a type of field that is included within the particular area. The computing server may select a handwriting recognition model for identifying the handwritten information in the particular area. The handwriting recognition model may be selected based on the type of the field. The computing server may input an image of the particular area to the handwriting recognition model to generate text of the handwritten information. The computing server may store the text of the handwritten information.

20 Claims, 22 Drawing Sheets

Related U.S. Application Data

(60) Provisional application No. 63/338,348, filed on May 4, 2022, provisional application No. 63/325,905, filed on Mar. 31, 2022, provisional application No. 63/314,780, filed on Feb. 28, 2022, provisional application No. 63/220,241, filed on Jul. 9, 2021.

(51) Int. Cl.
  *G06N 3/063* (2023.01)
  *G06V 10/82* (2022.01)

(58) Field of Classification Search
  CPC .... G06V 30/226; G06V 30/414; G06V 30/42; G06V 10/454; G06V 30/416; G06V 30/10; G06V 30/413; G06V 30/36; G06V 30/19173; G06V 30/1448; G06V 30/153; G06V 30/1452; G06V 10/764; G06V 30/19107; G06N 3/044; G06N 3/063; G06N 7/01; G06N 3/0442; G06N 3/0455; G06N 3/0464; G06N 3/084; G06N 3/09; G06N 3/08; G06N 3/045; G06Q 10/10; G06Q 50/18; G06Q 50/26; G06F 18/214; G06F 40/279; G06F 16/93; G06F 40/284; G06F 40/30; G06F 16/3344; G06F 18/2413; G06F 18/24765; G06F 18/28; G06F 40/174
  See application file for complete search history.

(56) References Cited

U.S. PATENT DOCUMENTS

| | | | | |
|---|---|---|---|---|
| 11,899,927 | B2* | 2/2024 | Tensmeyer | G06V 30/2264 |
| 11,921,777 | B2* | 3/2024 | Jain | G06F 18/22 |
| 2007/0280536 | A1* | 12/2007 | Zhang | G06V 30/2528 |
| | | | | 382/187 |
| 2008/0056578 | A1* | 3/2008 | Shilman | G06V 30/387 |
| | | | | 382/187 |
| 2013/0339002 | A1* | 12/2013 | Wakui | G06F 40/247 |
| | | | | 704/9 |
| 2015/0339525 | A1* | 11/2015 | Marcelli | G06V 30/226 |
| | | | | 382/161 |
| 2016/0012315 | A1* | 1/2016 | Perrin | G06V 30/1448 |
| | | | | 382/161 |
| 2016/0217119 | A1 | 7/2016 | Dakin et al. | |
| 2020/0257898 | A1* | 8/2020 | Cirimele | G06F 3/03545 |
| 2020/0302208 | A1* | 9/2020 | Hoehne | G06N 3/08 |
| 2021/0073530 | A1* | 3/2021 | Schaefer | G06V 30/422 |
| 2021/0124919 | A1* | 4/2021 | Balakrishnan | B42D 25/309 |
| 2021/0150338 | A1* | 5/2021 | Semenov | G06V 10/82 |
| 2021/0374455 | A1* | 12/2021 | Ghosh | G06V 30/413 |
| 2021/0406619 | A1* | 12/2021 | Lv | G06N 3/045 |
| 2022/0138453 | A1* | 5/2022 | Lee | G06V 40/30 |
| | | | | 382/181 |
| 2022/0375244 | A1* | 11/2022 | Mannby | G06F 40/279 |
| 2023/0004741 | A1* | 1/2023 | Xu | G06N 3/084 |
| 2023/0084845 | A1* | 3/2023 | Lu | G06V 30/413 |
| | | | | 382/176 |
| 2023/0115091 | A1* | 4/2023 | Horvay | G06V 10/82 |
| | | | | 382/123 |
| 2023/0134218 | A1* | 5/2023 | Semenov | G06V 30/413 |
| | | | | 382/159 |
| 2023/0138491 | A1* | 5/2023 | Semenov | G06N 3/08 |
| | | | | 382/176 |
| 2023/0139831 | A1* | 5/2023 | Wang | G06V 30/1444 |
| | | | | 704/9 |
| 2023/0245483 | A1* | 8/2023 | Zhang | G06V 30/1831 |
| | | | | 382/157 |
| 2023/0419710 | A1* | 12/2023 | Goyal | G06F 40/205 |
| 2024/0144728 | A1* | 5/2024 | Tang | G06V 40/33 |
| 2024/0184850 | A1* | 6/2024 | Khan | G06V 30/19147 |

OTHER PUBLICATIONS

Odeh, A. et al. "Hand-Written Text Recognition Methods: Review Study." IIETA: Revue d'Intelligence Artificielle, vol. 36, No. 2, Apr. 2022, pp. 333-339.

PCT International Search Report and Written Opinion, PCT Application No. PCT/IB2022/056310, Oct. 10, 2022, 12 pages.

* cited by examiner

FIG. 9D

HANDWRITING RECOGNITION PIPELINES FOR GENEALOGICAL RECORDS

CROSS-REFERENCE TO RELATED APPLICATIONS

The present application is a continuation of PCT Application No. PCT/IB2022/056310, filed on Jul. 8, 2022, which claims the benefit of U.S. Provisional Patent Application No. 63/220,241, filed on Jul. 9, 2021, U.S. Provisional Patent Application No. 63/314,780, filed on Feb. 28, 2022, U.S. Provisional Patent Application No. 63/325,905, filed on Mar. 31, 2022, and U.S. Provisional Patent Application No. 63/338,348, filed on May 4, 2022. All of the abovementioned applications are hereby incorporated by reference in their entirety.

FIELD

The disclosed embodiments relate to automatically parsing handwritten information in genealogical records, and more specifically to handwriting recognition techniques using one or more machine learning models.

BACKGROUND

A large-scale database such as a user profile and genetic database can include billions of data records. This type of database may allow users to build family trees, research their family history, and make meaningful discoveries about the lives of their ancestors. Users may try to identify relatives with datasets in the database. However, identifying relevant records in the sheer amount of data is not a trivial task. Datasets associated with different individuals may not be processed and indexed without a large amount of manual work. For example, genealogical records often involve digitalized historical records that involve a large amount of handwritten information that can be challenging to convert into computer text on a large scale without extensive manual labor.

Handwriting recognition is the task of converting a handwritten input into a set of digital characters forming a text. Each digital character may be machine-encoded with a letter code (e.g., using the ASCII standard) such that the converted text is usable within text-processing applications. While traditional image-to-text conversion techniques, such as optical character recognition (OCR), have shown to be accurate for images of typed or printed text, such techniques perform poorly with handwritten text, which has an infinite number of different styles as no two handwritten symbols are exactly identical.

Text recognition from handwritten record images is an important problem in the genealogy domain. Accurate and efficient text recognition can help genealogists discover and unlock family history. Automating the text recognition process would further benefit them by saving time, manual labor, and the associated cost. However, many document images suffer from challenges including varying noise conditions, interfering annotations, typical record artifacts like fading and vanishing texts, and variations in handwriting, each of which makes it difficult to transcribe.

SUMMARY

Disclosed herein relates to example embodiments of a computer-implemented method for recognizing handwritten information in a genealogical record. The computer-implemented method may include receiving a genealogical record. The genealogical record may take the form of an image of a physical form or document having a structured layout and a plurality of fields. The physical form contains handwritten information. The computer-implemented method may also include dividing the genealogical record into a plurality of areas based on the structured layout.

The computer-implemented method may further include identifying, for a particular area, a type of a field that is included within the particular area. The computer-implemented method may further include selecting, from a set of candidate handwriting recognition models, a handwriting recognition model for identifying the handwritten information in the particular area. The handwriting recognition model may be selected based on the type of the field included within the particular area. The computer-implemented method may further include inputting an image of the particular area to the handwriting recognition model to generate text of the handwritten information. The computer-implemented method may further include storing the text of the handwritten information as data associated with the genealogical record in a genealogical database.

In some embodiments, the computer-implemented method may further include generating a confidence score for the text predicted by the handwriting recognition model.

In some embodiments, the confidence score is generated by an audit model, and wherein the audit model is trained together with the handwriting recognition model.

In some embodiments, the audit model is configured to receive a plurality of image features from different layers of the handwriting recognition model and generate the confidence score based on the plurality of image features.

In some embodiments, dividing the genealogical record into a plurality of areas may include: identifying a first set of keypoints in the genealogical record; comparing the first set of keypoints to a second set of keypoints in a template record having template area coordinates; generating a transform based on the first and second set of keypoints; and generating divided area coordinates by applying the transform to the template area coordinates in the template record.

In some embodiments, identifying the first set of keypoints in the genealogical record includes comparing segments of the image of the genealogical record to segments of the template record, and the segments include corners but not a center.

In some embodiments, the type of the field in the particular area includes a name field, and the handwriting recognition model includes convolution layers, a transformer encoder and a transformer decoder.

In some embodiments, the type of the field in the particular area includes a checkbox field, and the handwriting recognition model includes convolution layers that are configured to identify a checkbox and a binary classifier that is configured to determine whether the checkbox is checked.

In some embodiments, the type of the field in the particular area includes a machine labeled field, and the handwriting recognition model includes a field prior that provides information related to machine-printed labels in the machine-labeled field.

In some embodiments, the handwriting recognition model includes: a convolutional neural network backbone that is configured to identify image features of the image; a sequence engine that includes a bi-directional long short-term memory network that is configured to use the image features to generate a sequence prediction; and a decoder that is configured to generate the sequence prediction to a text prediction.

In some embodiments, generating the text of the handwritten information by the handwriting recognition model includes: dividing a handwritten area into multiple spatial regions; identifying a character in each spatial region; generating a string of characters based on the character identified in each spatial region; and generating a text prediction based on the string of characters.

In some embodiments, the handwritten information includes a first collection of handwriting written in a first direction and a second collection of handwriting written in a second direction, and the handwriting recognition model is configured to rotate the second collection of handwriting written in the second direction.

In some embodiments, the genealogical record is part of a historical collection that has a recurring layout, and the structured layout is part of the recurring layout.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and memory coupled to the processors that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. (FIG.) 1 illustrates a diagram of a system environment of an example computing system, in accordance with an embodiment.

FIG. 9D is an example historical genealogical record that may be a divided area of a census record.

Figure 1:
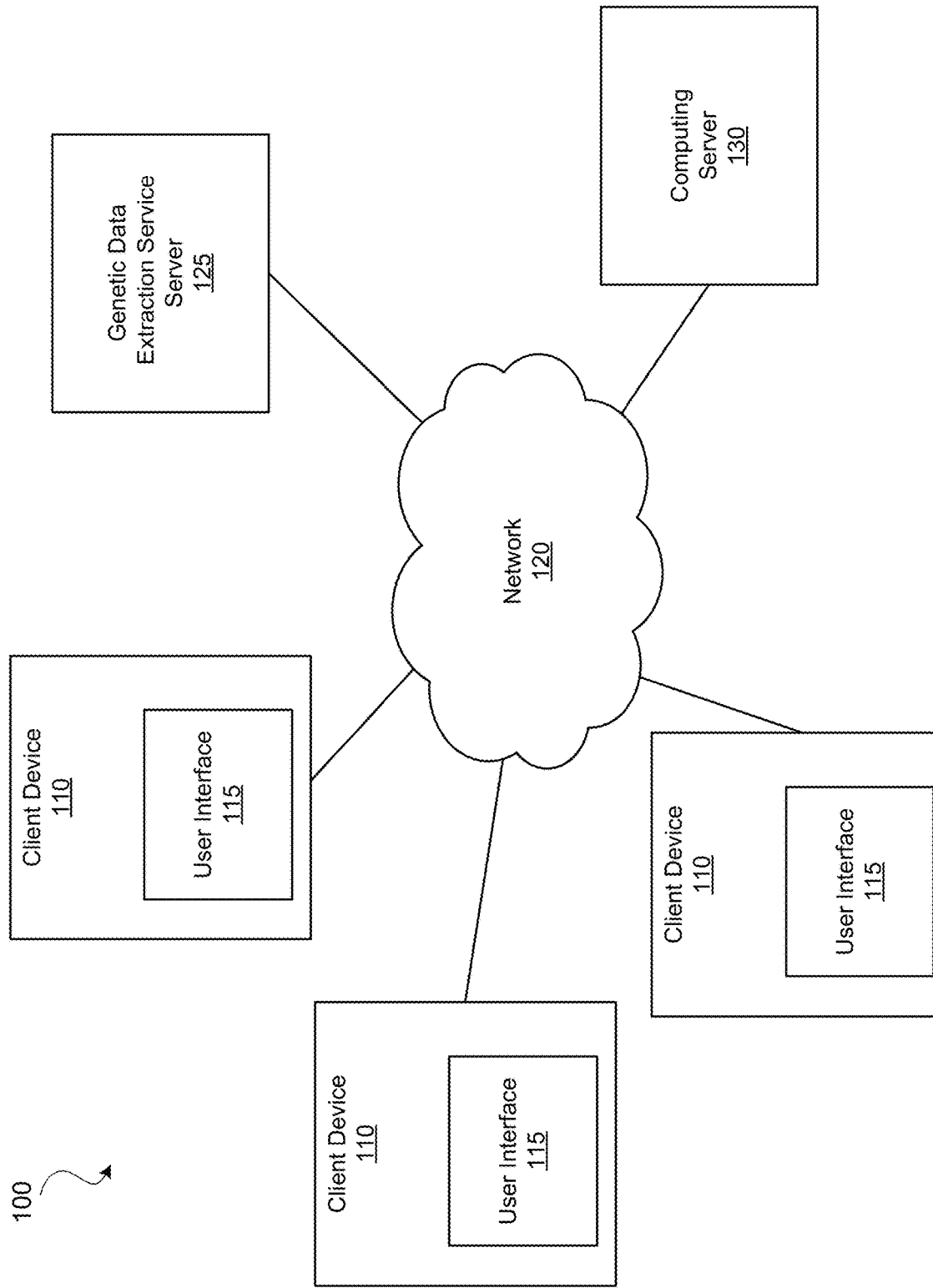

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Genealogical records are often related to old historical records that are hard to read due to the age of the documents, the quality of the digitalized images of the documents, poor or hard-to-recognize handwriting in the documents, and various factors. Extracting information in genealogical records could be extremely tedious and time-consuming. For example, given that U.S. Censuses were released to the public according to the "72-Year Rule," prior to the statutory release date of a particular census, such as the 1950 U.S. Census, there are no available data or populated forms available. Forms that are available currently are extremely dated forms whose information is challenging to parse. Moreover, given that there are millions of documents in a census, timely and automated modalities for extracting information therefrom are needed.

In some embodiments, a genealogical record, which may take the form of a newly digitalized image of a historical record of a physical form from which handwritten information is to be extracted, may include a specific layout that is familiar, such as similar to a known template format. However, the image may be distorted, rotated and otherwise changed from a standard template form so that the areas in the physical form do not completely align with the template form. Image processing techniques and machine learning models may be used to identify keypoints in the image based on the layout of the template form. The image of the genealogical record may be divided into different areas. For a particular divided area, one or more fields may be identified. A handwriting recognition model that specializes in recognizing handwritten information of a particular type of field may be selected from a set of candidate models each trained for different purposes and types of fields. The handwriting recognition model may include an image recognition backbone such as a convolutional neural network backbone and a sequence analyzer to recognize the text in the handwritten information.

Example System Environment

FIG. 1 illustrates a diagram of a system environment 100 of an example computing server 130, in accordance with an embodiment. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliance (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In one embodiment, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In one embodiment, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In one embodiment, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In one embodiment, a set of SNPs (e.g., 300,000) that are shared between different array platforms (e.g., Illumina OmniExpress Platform and Illumina HumanHap 650Y Platform) may be obtained as the genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in one embodiment, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In one embodiment, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, phenotypes are examples of biomarkers.

The computing server 130 performs various analyses of the genetic data, genealogical data, and users' survey responses to generate results regarding the phenotypes and genealogy of users of computing server 130. Depending on the embodiments, the computing server 130 may also be referring to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In one embodiment, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In one embodiment, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
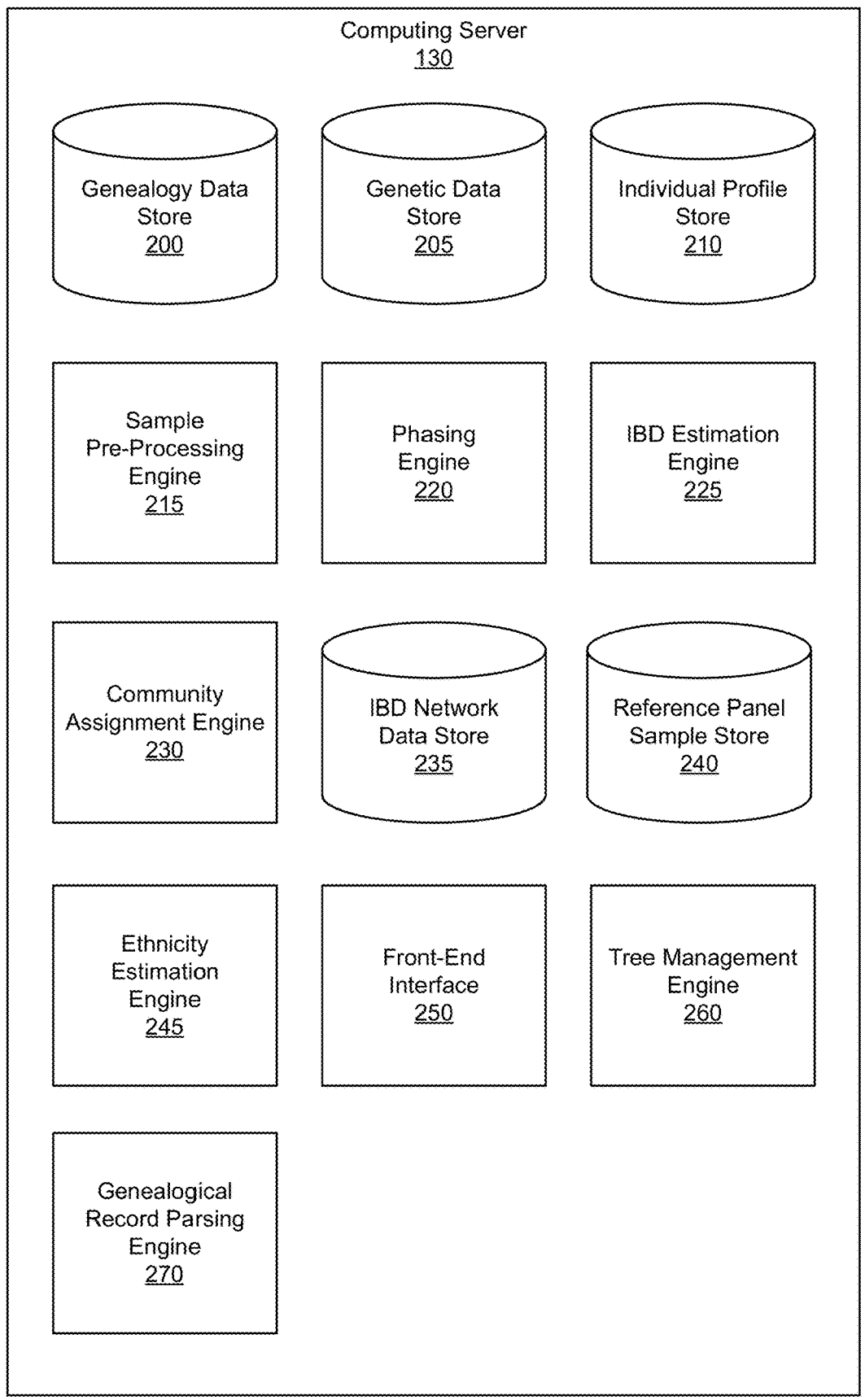
FIG. 2 is a block diagram of an architecture of an example computing system, in accordance with an embodiment.

FIG. 2 is a block diagram of an architecture of an example computing server 130, in accordance with an embodiment. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, tree management engine 260 and genealogical record parsing engine 270. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogical data, and survey response data. The computing server 130 processes the genetic data of users to identify shared identity-by-descent (IBD) segments between individuals. The genealogical data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogical data. The computing server 130 may also include survey questions regarding various traits of the users such as the users' phenotypes, characteristics, preferences, habits, lifestyle, environment, etc.

Genealogical data may be stored in the genealogy data store 200 and may include various types of data that are related to tracing family relatives of users. Examples of genealogical data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, offspring in some cases. Genealogical data may also include connections and relationships among users of the computing server 130. The information related to the connections among a user and her relatives that may be associated with a family tree may also be referred to as pedigree data or family tree data.

In addition to user-input data, genealogical data may also take other forms that are obtained from various sources such as public records and third-party data collectors. For example, genealogical records from public sources include birth records, marriage records, death records, census records, court records, probate records, adoption records, obituary records, etc. Likewise, genealogical data may include data from one or more of a pedigree of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data of the whole or portions of an individual's genome. The genetic data store 205 may store a pointer to a location associated with the genealogy data store 200 associated with the individual. A genetic dataset may take different forms. In one embodiment, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to as a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogical database. A unique individual identifier may a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointer associating genetic datasets such as genotype and phased haplotype data of the individual that are saved in the genetic data store 205. The metadata about the individual may also individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In one embodiment, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's diseases, diabetes, cancer, and obesity. The computing server 130 may obtain data of a user's disease-related phenotypes from survey questions of the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video games preferences, etc. Other questions may be related to the users' diet preference such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogical data may subject to the privacy and authorization setting from the users to specify any data related to the users can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access of the data and may change the setting as wish. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogical data public to allow the user to be discovered by other users (e.g., potential relatives) and be connected in one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in for sharing of those data or change the default privacy settings. In other cases, the heightened privacy settings may apply across the board for all data of certain groups of users. For example, if the computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogical data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogical data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. The human genome mutation rate is estimated to be $1.1*10^{-8}$ per site per generation. This may lead to a variant of approximately every 300 base pairs. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In one embodiment, the SNPs may be autosomal SNPs. In one embodiment, 700,000 SNPs may be identified in an individual's data and may be stored in genetic data store 205. Alternatively, in one embodiment, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in one embodiment, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, in determining the ethnic composition of an individual, and in determining the accuracy in any genetic data analysis, such as by computing a posterior probability of a classification result from a classifier.

A reference panel sample may be identified in different ways. In one embodiment, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, other quality control. Principal component analysis may be used to creates clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In one embodiment, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes representing different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverses the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, describes example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogical data search, family tree and pedigree, relative profile and other information. The front-end interface 250 may allow users to manage their profile and data trees (e.g., family trees). The users may view various public family trees in stored in the computing server 130 and search for individuals and their genealogical data via the front-end interface 250. The computing server 130 may suggest or allow the user to manually review and select potential related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed at the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be a common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and DNA test takers in the potential family trees through one or more machine learning models or other heuristic algorithms. For example, the tree management engine 260 may try putting the target individual in various possible location in the family tree and determine the highest probability position(s) based on the genetic datasets of the target individual and other DNA test takes in the family tree and based on genealogical data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user to conduct manual review as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

The genealogical record parsing engine 270 parses useful information from raw genealogical records to covert the information to indexed text that can be easily retrieved from genealogy data store 200. In some embodiments, the genealogical record parsing engine 270 may use one or more handwriting recognition pipelines to recognize text in the handwritten information of the raw image of historical genealogical records. One or more machine learning models may be trained to recognize text in different fields of genealogical records. Various examples of the genealogical record parsing engine 270 are discussed in FIG. 3 through FIG. 14.

Example Model Training and Deployment Architecture

Figure 3:
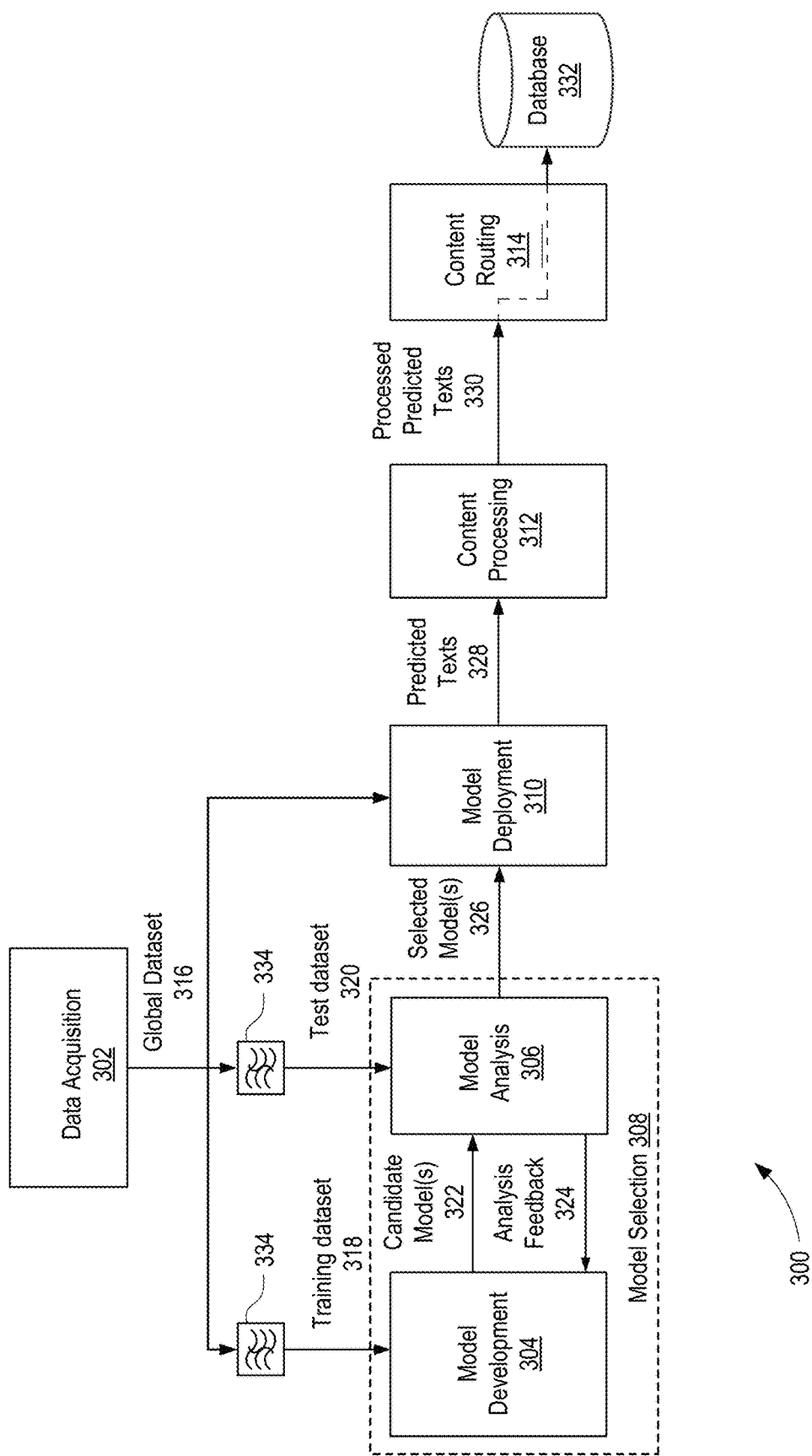
FIG. 3 is a block diagram that illustrates an example handwriting recognition architecture, in accordance with some embodiments.

FIG. 3 is a block diagram that illustrates an example handwriting recognition architecture 300, in accordance with some embodiments. The handwriting recognition architecture 300 may be one of the engines operated by the computing server 130, such as the genealogical record parsing engine 270. In various embodiments, handwriting recognition architecture 300 may also be referred to as a handwriting recognition system, a handwriting recognition platform, a handwriting recognition pipeline, a handwriting recognition workflow, among other possibilities. In some embodiments, one or more of the engines of handwriting recognition architecture 300 may be implemented as hardware elements with processors, memories, buses, communication interfaces, and the like. In some embodiments, handwriting recognition architecture 300 may be implemented as a computer-implemented process that may be performed using a CPU, a GPU, or any combination of processors. The process may be embodied as software algorithm that may be stored as computer instructions that are executable by one or more processors. The instructions, when executed by the processors, cause the processors to perform various steps and stages described in FIG. 3.

In the illustrated example, handwriting recognition architecture 300 includes engines for data acquisition 302, model development 304, model analysis 306, model selection 308 (including both model development 304 and model analysis 306), model deployment 310, content processing 312, and content routing 314. Using the illustrated engines, handwriting recognition architecture 300 may be employed to convert a global dataset 316 that includes images and other raw data of handwriting into processed predicted texts 330 with the use of one or more machine learning models. The machine learning models may be examples of handwriting recognition models that may be used by the computing server 130 to automatically parse handwritten information into text and save the text in various databases such as the genealogy data store 200 of the computing server 130. Once generated, processed predicted texts 330 may be outputted by handwriting recognition architecture 300 and used for downstream processing.

In data acquisition 302, data is acquired from various sources to form a global dataset 316. For example, one or more databases may be searched to retrieve images or other raw data of handwriting to be used within handwriting recognition architecture 300. In some embodiments, physical samples containing handwriting may be received at an optical sensor or other image capture device that scans images of the physical samples. In some embodiments, each image contained in global dataset 316 may be a single channel image (e.g., a grayscale image or a colorimetric grayscale image), a multi-channel image (e.g., a color image), among other possibilities, and may be represented in any one of a variety of image file formats (e.g., TIFF, GIF, PNG, JPEG). Global dataset 316 may be part of the genealogy data store 200.

In some embodiments, global dataset 316 may be passed through one or more filters 334 to form a training dataset 318 and a test dataset 320. As such, a training dataset 318 and a test dataset 320 may be a subset and/or a modification or transformation of global dataset 316. In some embodiments, training dataset 318 and test dataset 320 may be distinct and non-overlapping subsets of global dataset 316 such that no data used for training machine learning models is also used for evaluating the same machine learning models. In some embodiments, each of global dataset 316, training dataset 318, and test dataset 320 may be distinct and non-overlapping.

In model development 304, one or more machine learning models are trained using training dataset 318 and are outputted as candidate machine learning models 322. In some embodiments, candidate machine learning models 322 may be neural networks, such as convolutional neural networks, some with additional layers such as recurring layers and/or encoders for downstream sequence processing. In model development 304, analysis feedback 324 may be received from model analysis 306, which may include information that can be used to modify the architectures and parameters (e.g., hyperparameters, weights) of candidate machine learning models 322. In some instances, analysis feedback 324 includes evaluation metrics for candidate machine learning models 322. Model development 304 can analyze the evaluation metrics to determine which hyperparameters of candidate machine learning models 322 should be modified to further improve the evaluation metrics. Possible hyperparameters include the number or types of layers in the machine learning model (such as the number of shared or task-specific layers), the learning rate used during training, a scale factor used in the loss function during training, among other possibilities.

In model analysis 306, candidate machine learning models 322 are evaluated using test dataset 320 and one or more machine learning models are selected from candidate machine learning models 322 to form selected machine learning models 326. For example, model analysis 306 may evaluate each of the candidate machine learning models 322 by calculating evaluation metrics (e.g., precisions, recalls, accuracies, and/or f-scores) for candidate machine learning models 322. The evaluation metrics may be included in analysis feedback 324 to further develop the machine learning models or, in some instances, one or more machine learning models may be selected from candidate machine learning models 322 as selected machine learning models 326, which are outputted to model deployment 310. In some embodiments, selected machine learning models 326 may be the machine learning models that achieve the best results as determined by the calculated evaluation metrics.

In model deployment 310, selected machine learning models 326 are used to generate predicted texts 328 for global dataset 316. For example, an image of global dataset 316 may be provided to selected machine learning models 326 as input, which may then generate an output text for each of the images. In some embodiments, confidence scores corresponding to the predictions may also be generated by selected machine learning models 326. The confidence scores may be used to determine which images of global dataset 316 should be manually keyed. For example, images or portions of images with low confidence scores, e.g. below a threshold such as a predetermined threshold, may be manually keyed to generate the output text for those images.

In some embodiments, in content processing 312, predicted texts 328 may be processed (e.g., cleaned) to make the texts compatible with downstream processing. The output of content processing 312 is referred to as processed predicted texts 330. In some instances, predicted texts 328 may be processed by identifying and combining duplicate texts, deleting highly erroneous text or text that is unsuitable for downstream processing, making corrections to the texts, among other possibilities.

In content routing 314, processed predicted texts 330 may be routed to a destination (e.g., genealogy data store 200) and may be outputted by handwriting recognition architecture 300. In the illustrated example, processed predicted texts 330 are routed and stored in a database 332. In some embodiments, database 332 may be managed by the computing server 130, which may allow multiple user devices to access database 332. For example, database 332 may be part of the genealogy data store 200. In some embodiments, processed predicted texts 330 may be published for wide accessibility.

Figure 4:
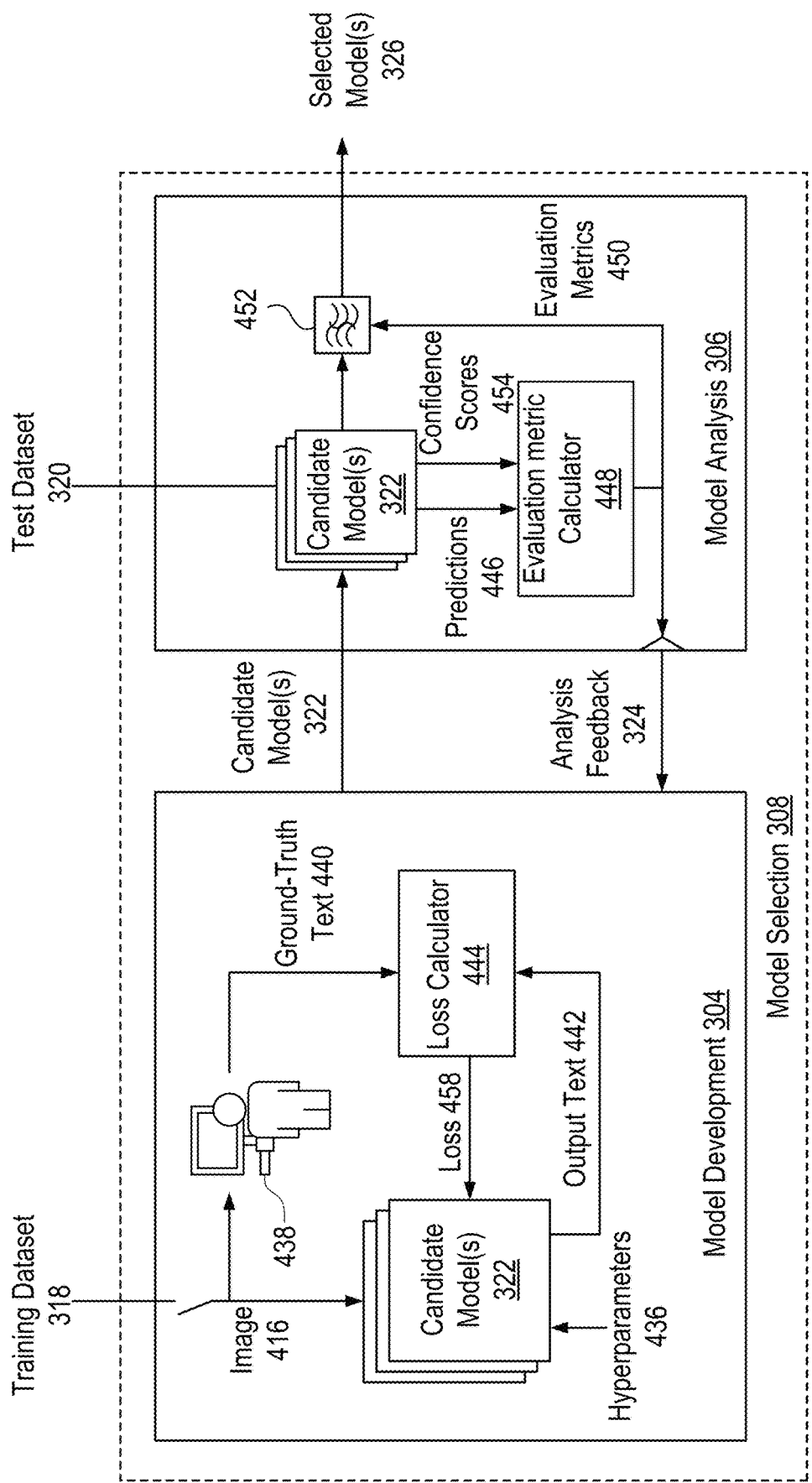
FIG. 4 is a block diagram that illustrates an example architecture for model selection including both model development and model analysis, in accordance with some embodiments.

FIG. 4 is a block diagram that illustrates an example architecture for model selection 308 including both model development 304 and model analysis 306, in accordance with some embodiments. In model development 304, the architectures of candidate machine learning models 322 are initialized or modified using a set of hyperparameters 436, which may specify the number or types of layers in the machine learning models. In some embodiments, hyperparameters 436 may further affect how candidate machine learning models 322 are trained (e.g., by specifying the learning rate used during training). Candidate machine learning models 322 are trained using training dataset 318 over multiple training iterations, with FIG. 4 illustrating a single training iteration.

During each training iteration, an image 416 is taken from training dataset 318 (which may include a large number of images to be used as training examples) and is provided both to a manual labeler 438 and to each of the candidate machine learning models 322. Manual labeler 438 may analyze image 416 and produce a ground-truth text 440. In some instances, manual labeler 438 is a genealogist who is trained to accurately recognize text from images. In response to being provided image 416 as input, each of the candidate machine learning models 322 may generate an output text 442 based on image 416 as well as each machine learning model's current set of weights.

Additionally, during each training iteration, output text 442 for each of the candidate machine learning models 322 may be compared to corresponding ground-truth text 440 by loss calculator 444 to compute a loss 458 for each of the candidate machine learning models 322, which loss 458 may be used to adjust the weights associated with candidate machine learning models 322. In some embodiments, loss 458 may be used to adjust the weights associated with candidate machine learning models 322 such that loss 458 would be reduced during subsequent predictions using image 416. In some embodiments, loss calculator 444 may calculate a loss function that is a function of a value from hyperparameters 436. In one example, the loss function is a negative log likelihood loss function.

The above-described training step may be iteratively repeated for each image 416 of training dataset 318. In some embodiments, the entire training dataset 318 may be used for training, while in other embodiments, only a portion of training dataset 318 may be used. In some embodiments, multiple epochs of training may be performed such that specific training examples (e.g., images) from training dataset 318 may be used multiple times. Other possibilities are contemplated.

After training, candidate machine learning models 322 are provided to model analysis 306, which evaluates candidate machine learning models 322 using test dataset 320. In some embodiments, each image from test dataset 320 is provided to each of the candidate machine learning models 322 as input to generate predictions 446, which may include output texts generated by candidate machine learning models 322. An evaluation metric calculator 448 may analyze predictions 446 to calculate one or more evaluation metrics 450 (e.g., precisions, recalls, accuracies, and/or f-scores) for candidate machine learning models 322. For example, predictions 446 may be compared to ground-truth texts prepared by manual labelers to calculate evaluation metrics 450.

In some embodiments, candidate machine learning models 322 may output a set of confidence scores 454 that are associated with predictions 446. Each of the confidence scores 454 may correspond to a likelihood that a corresponding prediction of predictions 446 is correct. In some implementations, each of the confidence scores 454 is a value between 0 and 3, with values closer to 3 indicating a high level of confidence and values closer to 0 indicating a low level of confidence. Evaluation metrics 450 may be calculated based on confidence scores 454 in addition to or alternative to predictions 446. In various embodiments, predictions 446, confidence scores 454, and/or evaluation metrics 450 may be included in analysis feedback 324.

Further in model analysis 306, one or more machine learning models are selected from candidate machine learning models 322 as selected machine learning models 326. This selection is illustrated in FIG. 4 by a filter 452 which selects selected machine learning models 326 from candidate machine learning models 322. In some embodiments, selected machine learning models 326 may be the machine learning models that achieve the best results as determined by evaluation metrics 450. In one example, any of the candidate machine learning models 322 having an evaluation metric (e.g., an f-score) above a predetermined threshold may be selected as selected machine learning models 326. In another example, the machine learning model from candidate machine learning models 322 having the highest evaluation metric (e.g., f-score) may be selected as selected machine learning models 326. In some embodiments, model development 304 and model analysis 306 may perform the above-described steps in a loop a predetermined number of times and/or until at least one of evaluation metrics 450 exceeds some threshold.

Figure 5:
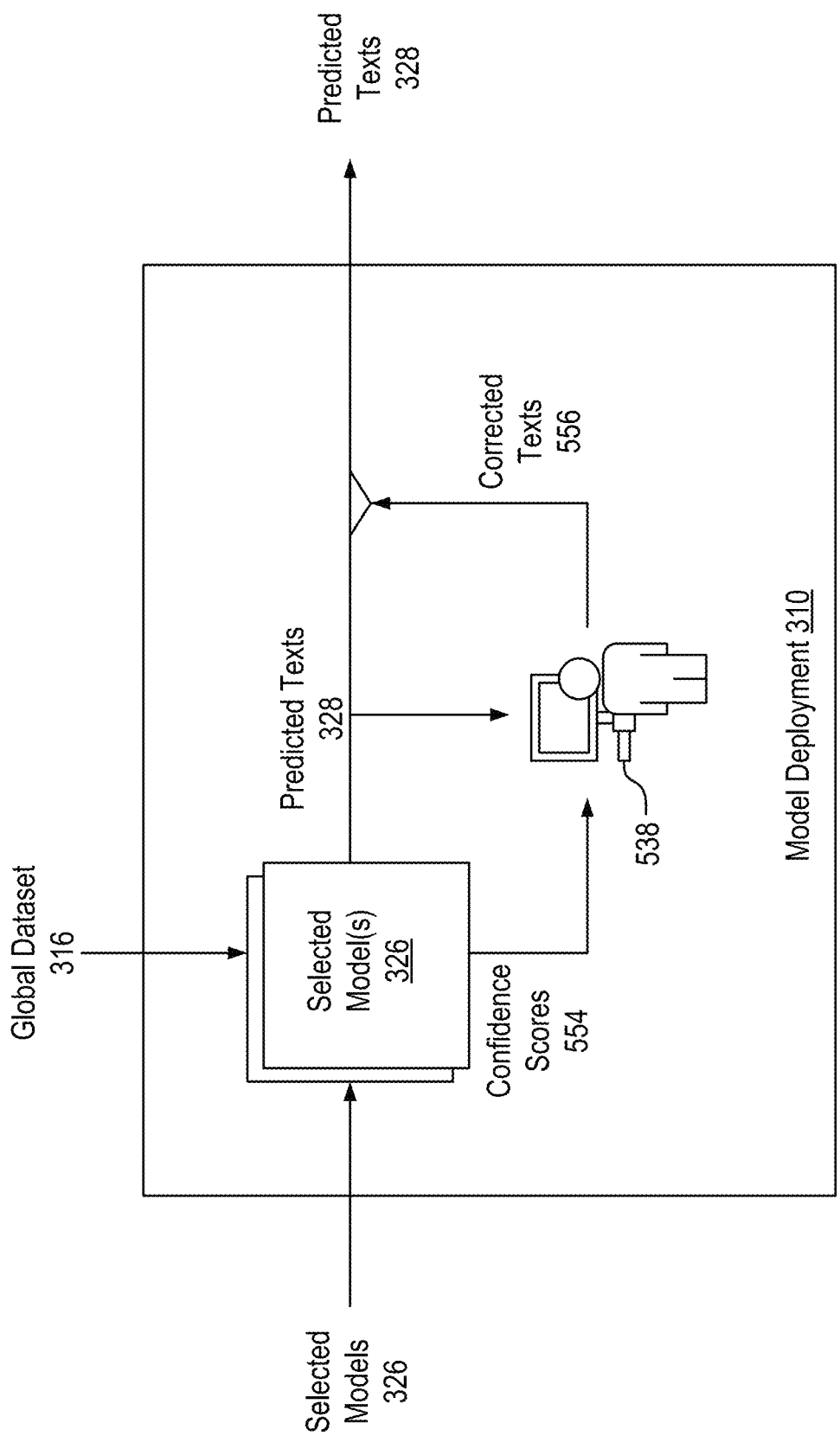
FIG. 5 is a block diagram that illustrates an example architecture for model deployment, in accordance with some embodiments.

FIG. 5 is a block diagram that illustrates an example architecture for model deployment 310, in accordance with some embodiments. In model deployment 310, an image from global dataset 316 is provided to selected machine learning models 326 as input to generate predicted texts 328, which may be stored as an output text for the image. Selected machine learning models 326 may further generate confidence scores 554 corresponding to a likelihood that a corresponding predicted text of predicted texts 328 is correct, as described above.

In some embodiments, confidence scores 554 are provided to a manual labeler 538 who may identify low confidence scores from confidence scores 554. Manual labeler 538 may then analyze the predicted texts from predicted texts 328 corresponding to the low confidence scores and may produce corrected texts 556, which may be a corrected version of the predicted texts having the low confidence scores. Alternatively or additionally, confidence scores 554 may be automatically analyzed to identify low confidence scores such as scores falling below a predetermined threshold, and the corresponding predicted texts may be provided to manual labeler 538. Corrected texts 556 may be combined with or used to correct or replace predicted texts 328 before predicted texts 328 are outputted by model deployment 310. In some embodiments, the confidence scores 554 may be generated by one or more machine learning models that specialize in auditing and evaluating the performance of the handwriting recognition machine learning models. Examples of the auditing machine learning models are further described in FIG. 8A through 8D.

Example Structured Form Handwriting Recognition

Figure 6A:
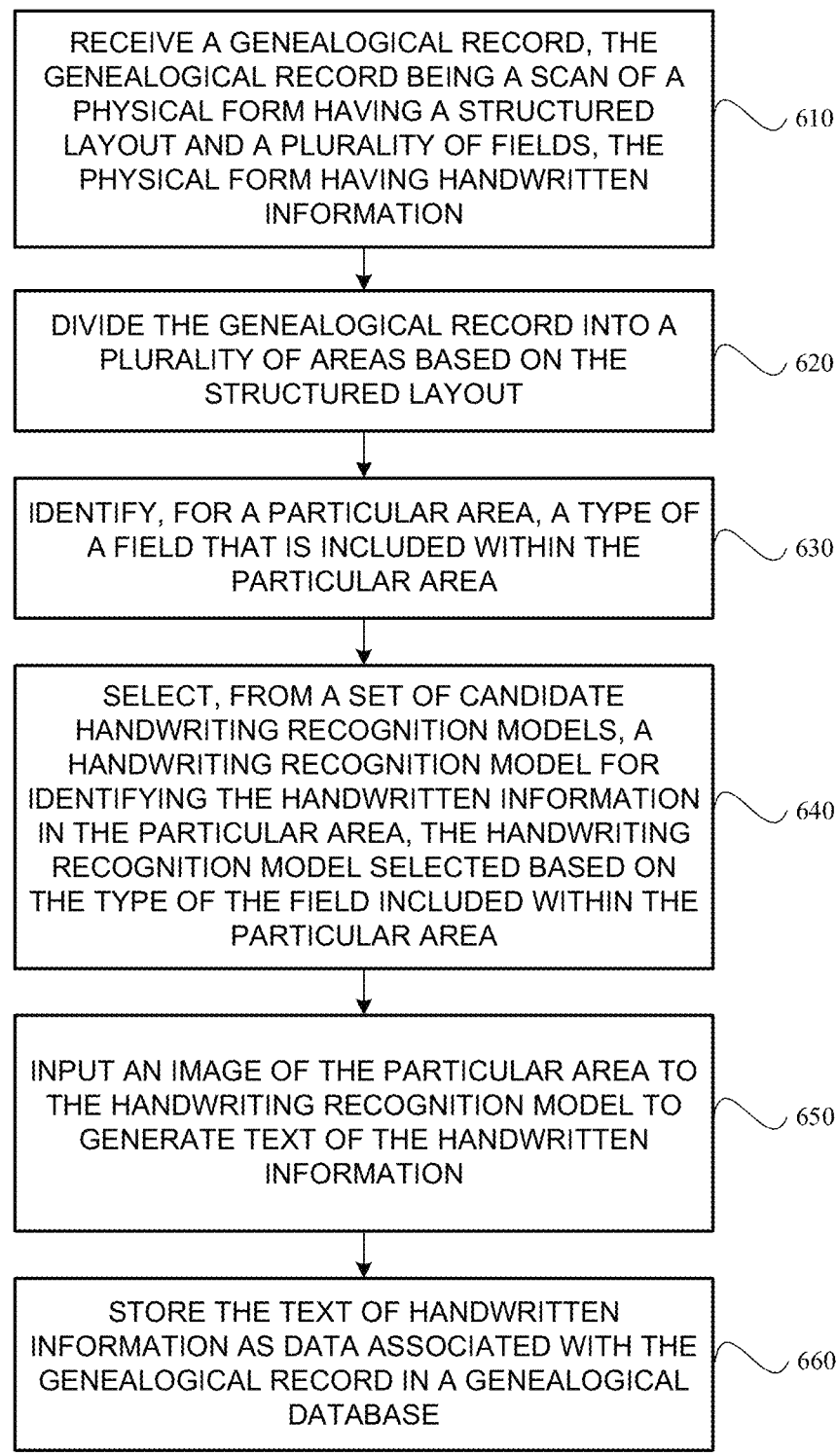
FIG. 6A is a flowchart depicting an example process for performing handwriting recognition in a structured form, in accordance with some embodiments.
Figure 6B:
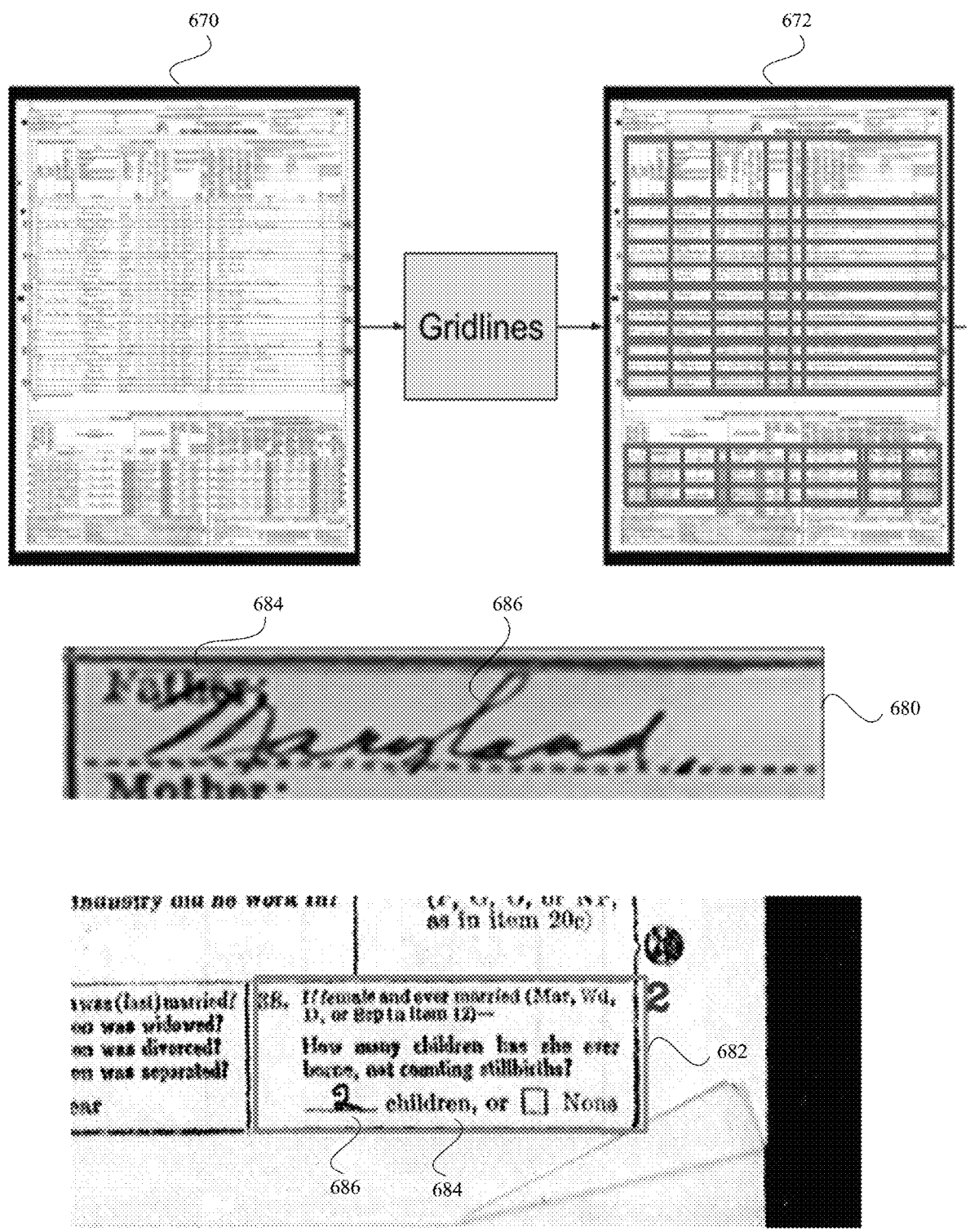
FIG. 6B is a conceptual diagram that graphically illustrates the example process, in accordance with some embodiments.

FIG. 6A is a flowchart depicting an example process 600 for performing handwriting recognition in or upon a structured form, in accordance with some embodiments. FIG. 6B is a conceptual diagram that graphically illustrates the process 600, in accordance with some embodiments. FIG. 6A and FIG. 6B are discussed in conjunction with each other. Process 600 may be an example of a sub-process of the handwriting recognition architecture 300.

The process 600 may be performed by a computing device, such as computing server 130, such as the genealogical record parsing engine 270. The process 600 may be embodied as a software algorithm that may be stored as computer instructions that are executable by one or more processors. The instructions, when executed by the processors, cause the processors to perform various steps in the process 600. Throughout this disclosure, while genealogical records are used as examples for documents that have handwritten information, various processes and architectures in this disclosure, including handwriting recognition architecture 300 and process 600, may also be used for other types of records or documents including handwritten records, historical records, machine-printed text, combinations and/or variations thereof, or otherwise as suitable, without the loss of generality.

In some embodiments, the computing server 130 may receive 610 a genealogical record. Again, the use of genealogical record as the document with handwritten information is merely an example and the process 600 may also be used for other types of records. In some embodiments, the genealogical record may take the form of a digitized historical record such as an image, which can be a scan of a physical form, e.g. a fillable government form such as a census document, that has a structured layout and a plurality of fields. The physical form has handwritten information. The genealogical record may be existing records stored in the genealogy data store 200 in which the handwritten text has not been parsed, or may be new records that are recently uploaded or imported to the computing server 130. The computing server 130 may receive 610 the genealogical record by retrieving the record from the genealogy data store 200 or by receiving the record from an external source such as a user upload, a batch import from a data source, or an API response that transmits the record.

A raw genealogical record before handwriting recognition may be in the format of an image file. For example, a genealogical record may take the form of a scan of a physical form such as a census record, a marriage record, a birth certificate, a death certificate, a military record, etc. The physical form may have a structured layout and a plurality of fields, e.g. fields comprising content such as handwritten information. In some embodiments, a genealogical record may be part of a historical collection census record collection for a particular decade, marriage records in a particular state, etc. The structured layout of a genealogical record may be a recurring layout of the historical collection. For example, for records that are within a time frame and from the same official department, the physical forms often share the same formats and structures with the same layout, although the handwritten information in each form is drastically different from one another. Within a collection, there may be a single layout that is common for the records in the collection or multiple layouts, each of which corresponds to a subset of records in the collection. Record 670 is an example of a raw genealogical record that has a structured layout and various fields. The particular layout and fields shown in record 670 are merely examples and will change in various embodiments and record collections.

The computing server 130 may divide 620 the genealogical record into a plurality of areas based on the structured layout. The division is graphically illustrated as the divided layout 672 in FIG. 6B. In some embodiments, the divided areas may take the form of or be represented as bounding boxes, although, in other embodiments, the divided areas may take any suitable sizes and shapes, whether the areas are rectangular or not, regular or irregular, symmetrical or not, and overlapping or not. The number of divisions may also depend on the structured layout and embodiments. A divided area may include one or more fields in the physical forms.

In some embodiments, each divided area may correspond to a single field in the physical form. In some embodiment, a divided area may include multiple fields of the same types. In some embodiments, the division of the areas may follow certain internal boundaries or lines of the structured layout.

In various embodiments, the division may be carried out by image processing techniques, machine learning models, and a combination of various techniques. For example, in some embodiments, a convolutional neural network may be trained as a gridline layout model that is capable of identifying various regions in the physical form and dividing the image of a genealogical record based on the structured layout of the physical form. Examples of gridline layout models are further discussed in association with FIGS. 7A and 7B. In some embodiments, image processing techniques may be used to divide the genealogical record into multiple areas. In some embodiments, within a collection, a heuristic algorithm may be used to identify key points of the structured layout of the genealogical record and divide 620 the record into multiple areas based on those identified key points. For example, internal line intersections may be used as key points of the structured layout. Within a collection of records that have the same layout, a genealogical record may be divided by the coordinates of the key points. In some embodiments, additional image processing techniques may be used to pre-process the image of the genealogical record. For example, a genealogical record may be a scan of a physical document so that the image of the scan might have a different size and resolution than other records in the same collection. In some cases, the scanned documents may also not be oriented properly. Image processing techniques may be used to rotate and scale the image of the genealogical record before the image is divided into multiple areas.

In addition to or alternatively to dividing the areas based on the structured layout, in some embodiments, the genealogical records may also be divided into multiple areas based on the fields in the physical form. The fields may be or include "First Name," "Address," "DOB," "Father's Name," tables, a list of checkboxes for questions, fill-in-the-blank questions, multiple-choice questions, etc. A field usually is readily identifiable by the field name with machine-printed text. The machine-printed text can be easily recognized with high accuracy. The field name may be labels such as "First Name," "Address," "DOB," and a question's text that is recurring for the type of form common in a genealogical collection. The computing server 130 may identify the fields and search for the nearby lines or other boundaries and dividers in the physical forms to divide the genealogical record into multiple areas.

The computing server 130 may identify 630, for a particular area, a type of field that is included within the particular area. The particular area may be one of the multiple areas divided from the image of the genealogical record. Examples of the divided areas are shown as areas 680 and 682. Each particular area, such as area 680 and area 682 may include field text 684 and handwriting information 686. While the example areas 680 and 682 each have a single field, in some embodiments, a particular area may also include multiple fields. The field text 684 refers to the machine-printed text that appeared in a field. In some embodiments, the field text 684 may be recognized accurately on the fly as a new genealogical record is analyzed. In some cases, the field text in a genealogical record is the same as other genealogical records in the same collection. As such, in some embodiments, the field text may be predetermined and verified manually before a new genealogical record is analyzed.

A field may be associated with different metadata that are used to identify and classify various fields. For example, the metadata may include a field name and a type of field. A field name may be an identifier that is used to identify a field. A field name may or may not correspond to the machine-printed text in the field. For example, in area 680, the field name may be "Father," which corresponds to the machine-printed field text 684 in area 680. In area 682, the field name may be "Number of Children," which does not completely correspond to the machine-printed field text 684 in area 682. In some embodiments, the field name may also be a unique identifier such as a random string of characters that is not English text.

In some embodiments, the type of field may be metadata that is used to classify the fields. Examples of the type of field may include general fields, name, occupation, and industry (NOI) fields, numeric, alphabetic, alphanumeric fields, machine-labeled fields, checkbox fields, vertical text fields, table fields, multiple-choice fields, etc. The granularity and hierarchy of the types of field may be defined depending on embodiments. For example, in some embodiments, the NOI fields may be separated into three different fields. The checkbox fields may be separated based on the types of checkboxes. In some embodiments, a type of field may be defined based on the corresponding machine learning model trained to recognize the handwritten information of the field. For example, if a machine learning model is trained using training samples that have a set of different fields, those fields may be classified as the same type. In some embodiments, the type of fields may also be defined based on the corpus of the training samples. For example, the corpus for names has a different collection of text than another field that does not involve named entities. A machine learning model that is trained with a corpus that focuses on names may specialize in recognizing names. The fields that involve names (e.g., first name, last name, father, mother, children, etc.) may be classified as the same type of fields.

The computing server 130 may select 640, from a set of candidate handwriting recognition models, a handwriting recognition model for identifying the handwritten information in the particular area. In some embodiments, the handwriting recognition model is selected based on the type of field included within the particular area. The set of candidate handwriting recognition models may be candidate machine learning models 322 or selected machine learning models 326 illustrated in the handwriting recognition architecture 300. The selection rule may be predetermined or dynamic.

In some embodiments, some candidate machine learning models are associated with structures and training samples that focus on a particular type of field. For example, a machine learning model may specialize in recognizing checkboxes and identifying handwritten information associated with the checkbox, and may be trained with images of various checkboxes. As such, those machine learning models may be predetermined to be used for areas that have certain types of pertinent fields. In some embodiments, a handwriting recognition model may also be selected dynamically. The computing server 130 may select the handwriting recognition model based on the confidence scores that predict the accuracy of various candidate handwriting recognition models in recognizing the handwritten information. For example, a few selected machine learning models 326 may have similar performance with respect to a particular type of field. Each of those selected machine learning models 326 may be used to predict the handwritten information in the field. A confidence score may be generated for each of those selected machine learning models 326. The computing server 130 may select the model that has the highest confidence score.

Various types of machine learning models may be used to recognize handwritten information in different fields. Examples of those machine learning models that may specialize in various types of fields are further discussed in FIG. 9A through FIG. 13.

The computing server 130 may input 650 an image of the particular area to the selected handwriting recognition model to generate text of the handwritten information. For example, for a particular area, such as area 680 or area 682, the image of the area may be part of the input of the selected handwriting recognition model. In some embodiments, additional data may be inputted into the selected handwriting recognition model. For example, the raw image of the entire physical form may be part of the input. The machine-printed field text 684 of the particular area may also be part of the input. In some embodiment, the entire field text 684 may be inputted into the selected handwriting recognition model. In other embodiments, only part of the field text 684 is inputted. In some embodiments, metadata related to the field, such as the field name and the type of the field, are also inputted.

In some embodiments, the handwriting recognition model may include one or more machine learning models that generate different outputs. For example, the handwriting recognition model may include a convolutional neural network (CNN) that is trained to predict particular handwritten characters in different locations of the forms. The handwriting recognition model may also include a sequence analyzer such as a bi-direction long short-term memory (LSTM) model that is used to predict the words based on the predicted characters generated by the CNN. In some embodiments, the handwriting recognition model may further include a performance evaluation model such as one of those models illustrated in FIG. 8A through 8D to generate a confidence score of the text prediction. The various machine learning models included in the handwriting recognition model may be trained together or may be modulated to be trained separately. For example, in some embodiments, the performance evaluation model may be trained together with the main text recognition models end-to-end. Various examples of handwriting recognition models are discussed in further detail in association with FIG. 9A through FIG. 13.

The computing server 130 may store 660 the text of the handwritten information as data associated with the genealogical record in a genealogical database, such as the genealogy data store 200. For example, the recognized text of the handwritten information may be used to automatically populate an entry of/for genealogical record available for query by users of the computing server 130. The text of handwritten information may also be indexed so that the genealogical record is easily searchable and retrievable. The computing server 130 may also cause the recognized text of the handwritten information to be displayed at a graphical user interface for a user to examine the genealogical record. In some embodiments, the extracted text that is associated with a particular field may be saved as metadata of an individual's profile, such as by associating the extracted text with one or more information fields related to the profile of the individual. The individual may be a historical person stored in the genealogy data store 200 of the computing server 130.

In some embodiments, the computing server 130 may automatically update the information of a person that is included in a family tree of a user based on the extracted text about the person that is parsed from a historical record of the person. Other suitable downstream processing of the recognized text is also possible. In embodiments, the stored text may be stitched or clustered together with other instances of a particular person in a stitched genealogical tree database so as to become available to users with different instances of a person or entity in their respective genealogical trees.

For a genealogical record, step 630 through step 660 may be repeated for various divided areas in the genealogical record to parse handwritten information in different fields of the form. For each divided area, a different handwriting recognition model may be selected for parsing the handwritten information.

Example Gridline Layout Models

Figure 7A:
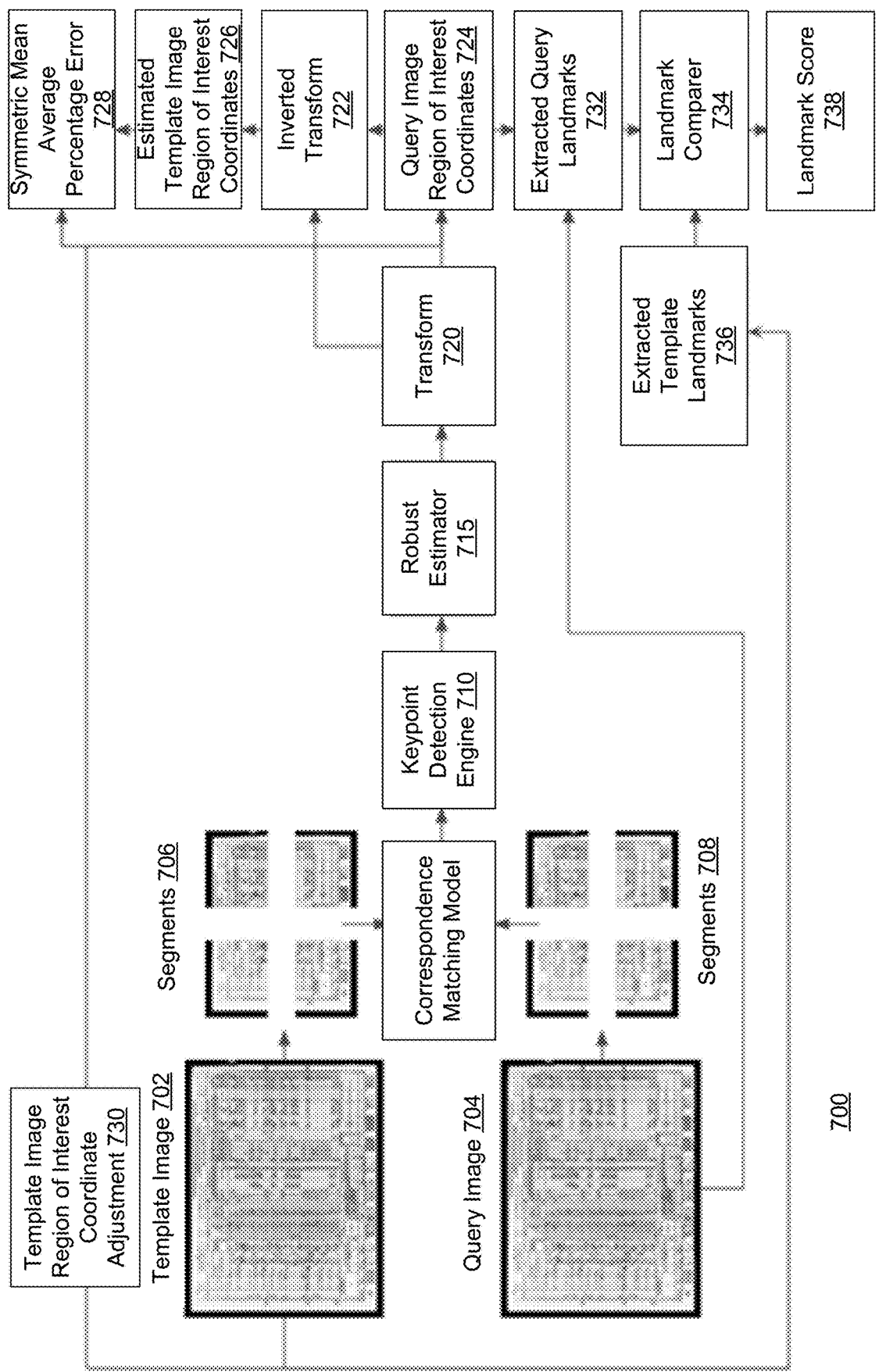
FIG. 7A is a block diagram that illustrates a gridline layout detection pipeline, in accordance with some embodiments.

FIG. 7A is a block diagram that illustrates a gridline layout detection pipeline 700, in accordance with some embodiments. The gridline layout detection pipeline 700 may be an example pipeline that is used in step 620 to divide a genealogical record into a plurality of areas. The gridline layout detection pipeline 700 may address shortcomings in the art by facilitating importing data from documents without relying on labeled data and supervised learning approaches. The gridline layout detection pipeline 700 may be performed by a computing device such as the computing server 130. The gridline layout detection pipeline 700 may be embodied as a software algorithm that may be stored as computer instructions that are executable by one or more processors. The instructions, when executed by the processors, cause the processors to perform various steps in the gridline layout detection pipeline 700.

In some embodiments, in carrying out the gridline layout detection pipeline 700, the computing server 130 may detect a layout of a genealogical record (e.g., a digitized historical record), which may take the form of an image, to facilitate the parsing of handwritten information therein. The handwriting recognition may be performed by one or more machine learning models, manually, or in any other suitable manner. Example handwriting recognition models will be further discussed in association with FIG. 9A through FIG. 13.

The genealogical record may be a census document (e.g., 1930 U.S. Census, 1940 U.S. Census, 1950 U.S. Census, etc.) or another suitable record document such as birth certificate, death certificate, marriage certificate, etc. While census records are used as examples in this discussion, other types of records may also be divided into areas using the gridline layout detection pipeline 700. An example of the genealogical record image is shown in FIG. 6B as record 670, which may be subdivided into rows and columns. In some embodiments, the layout of the genealogical record may follow certain patterns. For example, in some cases, a record may include rows that correspond to individuals and columns that correspond to predetermined information fields, such as name, address, occupation, age, etc.

The gridline layout detection pipeline 700 may advantageously utilize one or more template images and a model, such as a deep learning model, for detecting a layout of an image of a genealogical record. In some embodiments, a template image may include an image and a template, which may take the form of an auxiliary file that includes template area coordinates associated with the image. Template areas may be predetermined areas that define how the physical form in the template image may be divided. In some embodiments, the template areas may be referred to as bounding boxes. A template image with an associated template may be provided based on one or more sample images for a collection of target images. The template image with the associated template may include one or more template area coordinates identifying fields of interest in the physical form captured by the template image. As illustrated in FIG. 6B, the divided areas delineate fields within a genealogical record from which information may be extracted.

The template area coordinates may be determined manually and/or using a suitable automated object detection and image segmentation engine, such as the model described in U.S. Patent Application Publication No. 2021/0390704, published Dec. 16, 2021, entitled, "Systems and Methods for Identifying and Segmenting Objects from Images," which is incorporated by reference herein in its entirety for all purposes.

While the template image and the associated template with template area coordinates advantageously allow for the extraction of data from an image and to accurately associate the extracted data with a field and an individual, a problem with numerous document types and formats, including historical documents, is that a template image may not match the precise layout of other images in a collection. Historical documents, for example, may be digitized from a physical medium such as microfilm. During this process, the microfilm is stretched, which can non-uniformly and unpredictably deform and warp certain sections of the image such that the resulting image no longer matches perfectly an associated template. Further, such distortions often occur in non-uniform ways. For example, the center of an image may be more stretched than the edges of the image. The extent of stretching and other deformations of each image may differ from the other images in a collection.

In some embodiments, the template area coordinates are transformed to match one or more query images from which data is to be extracted. A query image may be an image of a genealogical record whose handwritten information is to be parsed by a handwriting recognition model. The computing server 130 may access one or more query images and determine a suitable transformation (e.g., image transformation) to apply to the template area coordinates so as to match the query image dimensions. In some embodiments, query images may be aligned with a template image and the associated template. The transformation may be generated by identifying a plurality of keypoints in the template image and the query image. This facilitates efficient and accurate machine extraction of data from the query image regardless of non-uniform distortions. The keypoints may be any suitable, identifiable points in the physical form, such as intersections between two lines, corners, locations of certain common characters such as machine-printed text used in the forms, etc.

To identify the keypoints in an image, the computing server 130 may utilize a keypoint detection engine 710. The keypoint detection engine 710 may include a deep learning model, such as Detector-Free Local Feature Matching with Transformers ("LoFTR"), which identifies local features in images and matches those local features between the images. This advantageously facilitates the use of the keypoint detection engine 710 without the need for fine-tuning and without knowing exactly what the forms will look like ahead of time.

In some embodiments, the keypoint detection engine 710 is used for an entire image or with one or more portions of an image. For example, one or more corner regions of an image may be provided to the keypoint detection engine 710. In some embodiments, both a template image and a query image may be provided to the keypoint detection engine 710 so as to generate a transformation therebetween. This may be repeated for each query image in a collection of query images.

While LoFTR has been described, various other models may also be used for identifying keypoints. For example, Coordinate Translator ("CoTr"), other suitable deep registration models, or non-deep learning models may be used as suitable. In some embodiments, a computer-vision approach entailing SIFT features and feature matcher may be used as suitable.

It has been surprisingly found that by extracting and providing corner regions of an image, as opposed to whole images, the keypoint detection engine 710 achieves better reliability and accuracy in some embodiments. It is partially because the keypoint detection engine 710 focuses less on the center of the image (where warping and other disruptions are likely to occur) and more on the edges of the image. This advantageously focuses the keypoint detection engine 710 on regions of the image where machine-printed text is more likely to appear, allowing the model to identify more-reliable keypoints. In some embodiments, focusing on the corners allows for increased reliability as the distortions in the center of the image may cause a failure of the keypoint detection engine 710 and downstream tools. In contrast, focusing on the corners advantageously allows the keypoint detection engine 710 to avoid errors from such distortions and to align the images on more-robust keypoints. Providing a handwriting recognition model that has built-in robustness toward added space at the margin of an input image, such as a cell of a table, allows for focusing the keypoint detection engine 710 on corners as opposed to a center of an image where distortion may be greater.

In some embodiments, focusing on the corner areas further provides the advantage of improving processing speeds, as only a small proportion of images need to be processed by the keypoint detection engine 710 to generate a suitable transformation. Further, this avoids the problem of having to resize entire images to deal with memory constraints of the keypoint detection engine 710. Further, this avoids losing information during aggressive resizing operations. This results in better detail retention. In some embodiments, the downstream provisioning of a handwriting recognition model configured to be robust against marginal inclusions of undesired or extraneous material further enables the provisioning of a keypoint detection engine 710 that focuses on edges or corners of query images as opposed to the center regions. In some embodiments, a deep learning model may be designed to advantageously allow for running on a GPU, which provides GPU acceleration.

In some embodiments, the keypoint detection engine 710 is combined with a downstream handwriting recognition model that is robust to marginal inclusions of extraneous material, which allows for utilizing the keypoint detection engine 710 despite the challenging nonuniformities of distortions in the pertinent documents, and which the inputs to the keypoint detection engine 710 being adjusted—e.g., by providing the corners instead of entire input images—advantageously facilitate. It will be appreciated that while corners, including all four corners, may be retained instead of a center of a document in some embodiments, in other embodiments, other operations such as retaining a center rather than corners or any other suitable arrangement, are envisioned.

Referring to the gridline layout detection pipeline 700 as illustrated in FIG. 7A, in some embodiments, a template image 702 and corresponding suitable segments 706 thereof are provided to a keypoint detection engine 710. Simultaneously, previously, subsequently, in parallel, or otherwise, a query image 704 and corresponding segments 708 thereof are provided to the keypoint detection engine 710. The keypoints determined by the keypoint detection engine 710 are output to a robust estimator 715. In some embodiments, the shared keypoints are filtered by, e.g., confidence score, which may be determined by the keypoint detection engine 710.

The robust estimator 715 may advantageously determine from the filtered keypoints a transform 720 to be applied to coordinates of template areas for the template image 702. Alternatively or additionally, the transform 720 may be applied to the query image 704 to match the template image 702. In some embodiments, the transform 720 is a perspective transform 720 that may include, e.g., a 3×3 matrix, but the disclosure is not limited thereto. The robust estimator 715 may calculate a homography matrix that is robust to erroneous shared keypoints. The generated transform may then be applied to the areas for the query image 704, e.g. to generate query image region of interest coordinates 724, allowing the data in the query image 704 to be properly, automatedly, and efficiently extracted.

An advantage of the above-described method is that by generating a transform 720 based on the template image 702 and transforming areas for a query image to match the template, the template image 702 and the associated template—with the template area coordinates—may be adjusted as needed without the need to re-register the query images thereto. As such, a collection, such as the U.S. Census of a decade, may be processed without interruption or duplicated effort while also improving and iterating upon the templates relied upon as needed.

There are at least five versions of the general population Census form and several other forms corresponding to, e.g., U.S. Territories, Puerto Rico, and Indian Reservations, respectively, but only one layout has been released ahead of the 1950 Census release. As such, it is unknown how well the template image and the associated template may correspond to the actual 1950 Census documents, given the non-uniformities introduced during the digitization process, including, e.g., warping, image-compression issues, and other problems. The disclosed embodiments advantageously facilitate on-the-fly adjustments to the template, for example as all versions of the layout become known and as the distortions in the document become known, without re-registering each query image to the updated template images.

In some embodiments, only a transform 720 is generated. Templates may be generated and applied iteratively to the query images 704 without re-processing the query images 704. In the case of U.S. Census records, highest-priority fields, such as name fields, may be targeted with early templates, and additional fields may be targeted with subsequent templates. The approaches of embodiments allow for changing or substituting templates as needed and without reworking or reprocessing query images.

In some embodiments, the robust estimator 715 may receive the keypoints which may be preprocessed. The keypoints may be filtered by, e.g., confidence score. The keypoints may be filtered according to confidence scores such that only the most-confident scores are retained. An algorithm such as a Random Sample Consensus ("RANSAC") or Universal RANSAC ("USAC") may be utilized as the robust estimator 715 to randomly sample the filtered keypoints and generate a transform as a consensus between the sampled keypoints. Alternatively, MAGSAC++ or any other suitable modality may be used.

In some embodiments, the transform 720 is inverted 722, the calculated query coordinates 724 are then converted back to estimate the template coordinates 726 using the inverted transform 722, and an error 728 therebetween is determined. A symmetrical mean average percentage error 728 is used in some embodiments to ascertain how good the alignment between the template image 702 and the query images 704 actually is. In some embodiments, the symmetrical mean average percentage error 728 may be determined because of the absence of labeled training data. Based on the symmetrical mean average percentage error 728, adjustments 730 may be made automatically to the template, template image 702, keypoint detection engine 710, or otherwise.

In some embodiments, landmarks 732 are extracted from both a template image 702 and a query image 704. The extracted landmarks may be identifiable fields, structures, tables, or objects in physical forms. For example, the extracted landmarks 732 may be ascertained because, in the U.S. Census examples, landmarks denoting a supplemental question row may be used to link data from the supplemental question row to the supplemental question fields at the bottom of the document. Extracting such landmarks using a model is not a trivial task. For example, enumerators often include notes in the margins of the documents that can be easily confused by a machine with a supplemental question indicium.

In some situations, some landmarks, such as the supplemental question row examples, are at different locations and/or at differently numbered rows. For example, row 14 in one document may be at the same location as row 55 in a subsequent document. In other situations, some landmarks, such as the supplemental question rows (of which there may be two in a single document), are arranged with one supplemental question row in the same location as the first supplemental question row of a previous document and the other supplemental question row in a different location relative to the second supplemental question row of the previous document. Contrasting the differences and other effects within the images may further complicate the task of linking landmarks and related fields.

In some embodiments, a landmark comparer 734 may be used to compare the extracted query landmarks 732 and the extracted template landmarks 736. For example, a machine learning model such as a convolutional neural network ("CNN") is provided to determine a similarity between landmarks in two images, e.g. between a query image 704 and a template image 702. The CNN may be configured to extract usable features in spite of contrast differences or other noise. The features suggesting a relationship between supplemental question rows and supplemental question fields as determined by the CNN allow for the selection of an appropriate template for the query image to properly link the supplemental question rows and supplemental question fields.

In some embodiments, a query image may be compared against one or more candidate template images before generating keypoints therefrom. This may be performed where a plurality of templates exist, as in the 1950 U.S. Census where a plurality of general population forms were used. A landmark score 738 for the template image 702 vis-à-vis the query image 704 may be generated. The scores 738 for the compared template images may be compared with the highest scoring template—representing the best-aligned template image for the particular query image—being selected and used for keypoint identification.

It has been found that not all query images have the same dimensions, which hampers performance of the gridline detection approaches described herein. It has been found that performance may be substantially improved, however, by padding query images with additional pixels such that all or substantially all query images have the same or substantially the same dimensions and/or by ensuring a consistent padding size aspect ratio and percentage of height/width aspect ratios across the query images.

Figure 7B:
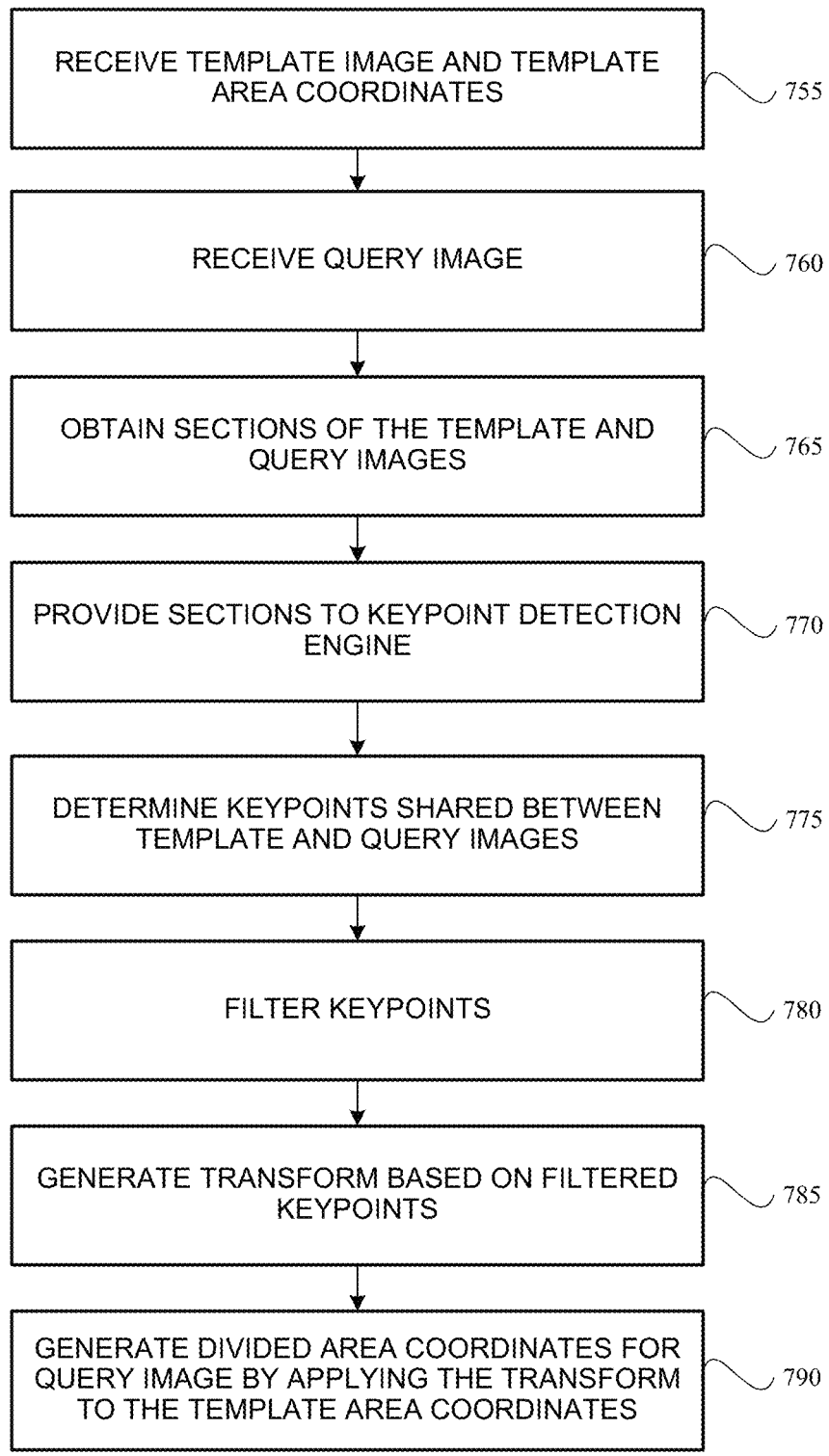
FIG. 7B is a flowchart depicting a computer-implemented process for generating divided areas of a genealogical record, in accordance with some embodiments.

FIG. 7B is a flowchart depicting a computer-implemented process 750 for generating divided areas of a genealogical record, in accordance with some embodiments. The process 750 may be performed by a computing device, such as computing server 130. The process 750 may be embodied as a software algorithm that may be stored as computer instructions that are executable by one or more processors. The instructions, when executed by the processors, cause the processors to perform various steps in the process 750.

The computing server 130 may receive 755 a template image, such as a template image corresponding to a genealogical collection (e.g., template image for 19XX Census records, e.g. the 1950 U.S. Census) and associated template area coordinates. The computing server 130 may receive 760 a query image of a genealogical record from which handwritten information is to be extracted. The computing server 130 may obtain 765 predetermined sections of the template image and the query image.

In some embodiments, the predetermined sections are the corners only without the center. In some embodiments, the sections span N % (e.g., 76%) of the height of the image and M % (e.g., 70%) of the width, though the disclosure is not limited thereto. In embodiments, 20% of the width and 30% of the height of the image is retained such that 24% of the original image is retained in an even or substantially even split between four corner sections. In embodiments, the proportions of the image that are retained are determined such that the image is small enough to process quickly but large enough to retain features for accurately matching query and template images. The computing server 130 may provide 770 the sections of the images to a keypoint detection engine 710 which may include a correspondence matching model.

The computing server 130 may determine 775 one or more keypoints shared between the template image and query image. The computing server 130 may filter 780 the keypoints and keep only those keypoints with the highest confidence scores. The computing server 130 may generate 785 a transform based on the shared, high-confidence keypoints. The computing server 130 may generate 790 divided area or region-of-interest coordinates for the query image by applying the transform to the template image template area coordinates. For example, the transform is used to transform the templates for the template image to match the query image. In some embodiments, downstream models, such as handwriting recognition models, may retrieve data from the query image using the generated region-of-interest coordinates and properly associate the extracted data with an information field.

In some embodiments, the computing server 130 may generate an inverted transform based on the transform. The computing server 130 may generate estimated template area coordinates for the template image by applying the inverted transform to the query image template area coordinates generated at 790. The computing server 130 may determine a symmetric mean average percentage error by comparing the original and new template area coordinates for the template image, and facilitate adjustment of one or more components of the system or method based on a determined loss therebetween.

In some embodiments, the computing server 130 may retrieve query image landmarks. The computing server 130 may provide the query image landmarks 732 and the template image landmarks 736 to a landmark comparer 734. The landmark comparer 734 may generate landmark scores 738. The landmark scores 738 allow for matching a template to a query image for, e.g., linking the information in particular fields with detected landmarks according to a template. In some embodiments, the landmark comparer 734 may utilize mobilenetv3 model, a generic feature extractor, or any other suitable model.

In an embodiment, results from the gridline layout model may be checked for accuracy by applying the generated transform and performing handwriting recognition using a suitable handwriting recognition model on a select, e.g. predetermined, portion of the content of one or more query images, in embodiments each query image. In an embodiment, certain line numbers, such as machine-printed line numbers of a census document, may be selected and processed using a suitable handwriting recognition modality, such as a generic handwriting recognition model as described herebelow. Templates for query images whose line numbers match against a corresponding line numbers of a template image by a predetermined threshold may be assessed to be sufficiently accurate. In an embodiment, 12 line numbers from a top of a document and 12 line numbers from a bottom of the document comprising 30 total lines are checked, and a quality threshold is whether 9 of the 24 selected line numbers match, though different selections, numbers, and thresholds are contemplated. This advantageously ensures that a substantial entirety of a document is assessed, as warping often occurs in discrete areas of a page, such as concentrated at a bottom of a page. By taking top and bottom rows or lines, warping across the page can be accounted for. In another embodiment, 12 lines and associated numbers are selected from the image, wherein if all 12 line up, the threshold is met.

It has been found that because line numbers in form documents, such as U.S. census forms, are typically sequential, using a handwriting recognition model to receive an image segment comprising line numbers and predict the text thereof facilitates checking for the expected sequence or pattern of line numbers. To the extent that the predicted text aligns or substantially aligns to an expected pattern, as judged using a predetermined threshold, the system, method, or computer-program product of embodiments may assess that the transform generated by the gridline layout detection model and/or that the proper template image has been selected for generating the transform therefrom.

Example Performance Evaluation Models

FIG. 8A through 8D are block diagrams illustrating components of handwriting recognition processing and analysis pipelines, in accordance with some embodiments. The pipelines may be part of the genealogical record parsing engine 270. The pipelines illustrated in FIG. 8A through 8D include performance evaluation models that generate the confidence scores of handwriting recognition models. The performance evaluation models may also be referred to as audit models, auditnets, or confidence score audit engines. In some embodiments, improving or maximizing the confidence scores generated as part of the handwriting recognition pipeline may significantly reduce the expenses associated with performing handwriting recognition. This is due, at least in part, to a correspondingly reduced cost of downstream human auditing, e.g. manual labeling, of the handwriting recognition results with low confidence scores. For example, the improvement of confidence scores reduces the number of results with erroneously low confidence scores to be sent to and analyzed at great cost by manual labelers.

A confidence score audit engine, with examples that are shown in FIG. 8A through FIG. 8D, may be trained to compare a handwriting prediction and a corresponding ground truth or manual label, and to assign a confidence score in a predetermined range. The predetermined range may be 0-1, with 0 corresponding to no confidence in the accuracy of a prediction and 1 corresponding to full confidence in the accuracy of the prediction. The confidence score audit engine may be trained end-to-end with a handwriting recognition processing and analysis pipeline or may be separately trained. In some embodiments where the confidence score audit engine is trained end-to-end with the handwriting recognition processing and analysis pipeline, both the audit model and the handwriting recognition model have been observed to synergistically improve in their accuracy and robustness.

A confidence score audit engine may be configured to receive any size of the input image. Global max pooling layer(s) may be used to handle any size of the input image. The engine may further be configured to include spatial and decode elements into a confidence score, as numerous factors such as image quality have been found to be able to lead to a low confidence score. The engine may be configured to consider both image quality features as well as text-only features.

Figure 8A:
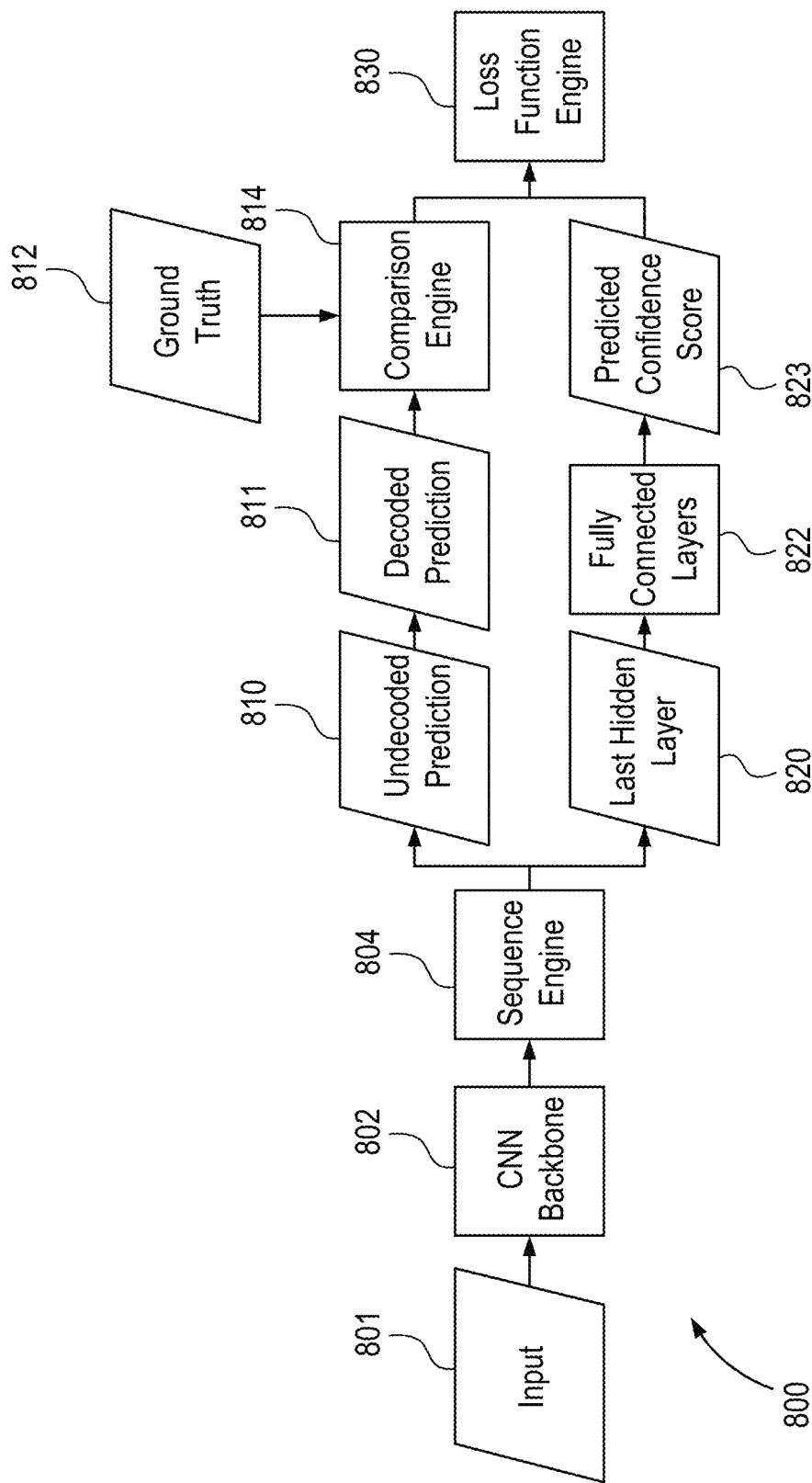
FIG. 8A is a block diagram illustrating the structure of a first example confidence score audit engine that includes a handwriting recognition model, in accordance with some embodiments.

FIG. 8A is a block diagram illustrating the structure of a first example confidence score audit engine 800 that includes a handwriting recognition model, in accordance with some embodiments. The confidence score audit engine 800 may include a convolutional neural network (CNN) backbone 802 configured to receive an input 801. The CNN backbone 802 may be part of the handwriting recognition model. The input 801 may be an input image of handwriting, a handwriting recognition prediction, or otherwise. For example, the input 801 may be a divided area (e.g., area 680 or 682 in FIG. 6B) of a genealogical record generated by the gridline layout detection pipeline 700. The CNN backbone 802 may be configured to generate one or more feature maps based on the input 801, which are passed as input to a sequence engine 804. The sequence engine 804 may be a long short-term memory ("LSTM") model and/or another component.

The output of the sequence engine 804 may be an undecoded prediction 810, e.g., a prediction of a handwriting character strings of the image's content. The output of the engine 804 may be fed in parallel to the last hidden layer 820, which may be the last hidden state of the neural network of the handwriting recognition model. In some embodiments, this may be the last hidden output from a sequence engine. The output of the last hidden layer 820 may be passed to one or more fully connected ("FC") layers 822, which, in turn, may be configured to output a predicted confidence score 823.

The undecoded prediction 810 may be transformed in any suitable manner and/or by any suitable utility to yield a decoded prediction 811. The decoded prediction 811 may be the recognized text that is generated from the undecoded prediction 810, which may be a string of characters. The decoded prediction 811 may be compared in a comparison engine 814 against a manual label 812, such as the training label that may also be referred to as the "ground truth." The CNN backbone 802, sequence engine 804, decoded prediction 811, the last hidden layer 820 and the fully connected layer 822 may be part of a handwriting recognition model. Further detail on the structure of handwriting recognition models and examples of handwriting recognition models are discussed in FIG. 9A through FIG. 12A. Those handwriting recognition models may be used in place of, or in addition to, the CNN backbone 802 and sequence engine 804.

The comparison engine 814 may be an audit target function in some embodiments. The comparison engine 814 may determine whether the decoded prediction 811 and the ground truth 812 are the same; the resulting similarity value therebetween may be normalized between 0 and 1. That is, the closer the decoded prediction 811 is to the ground truth 812, the closer the label is to "1." In opposite, a label of "0" is applied. The distribution between 0 and 1 is determined in some embodiments by the comparison engine 814, e.g., the audit target function. This is merely exemplary, and the disclosure is by no means limited to this manner of classification/comparison. The difference between prediction(s) and ground truth(s) may be determined in any suitable manner, including character error rate, e.g., the edit distance over the number of characters.

The predicted score 823 from the one or more FC layers 822 may be compared against a similarity score output from the comparison engine 814 in a loss function engine 830. In some embodiments, the loss function engine 830 utilizes a binary cross-entropy function to determine a loss between the decoded prediction score determined in the comparison engine 814 and the predicted confidence score 823.

Figure 8B:
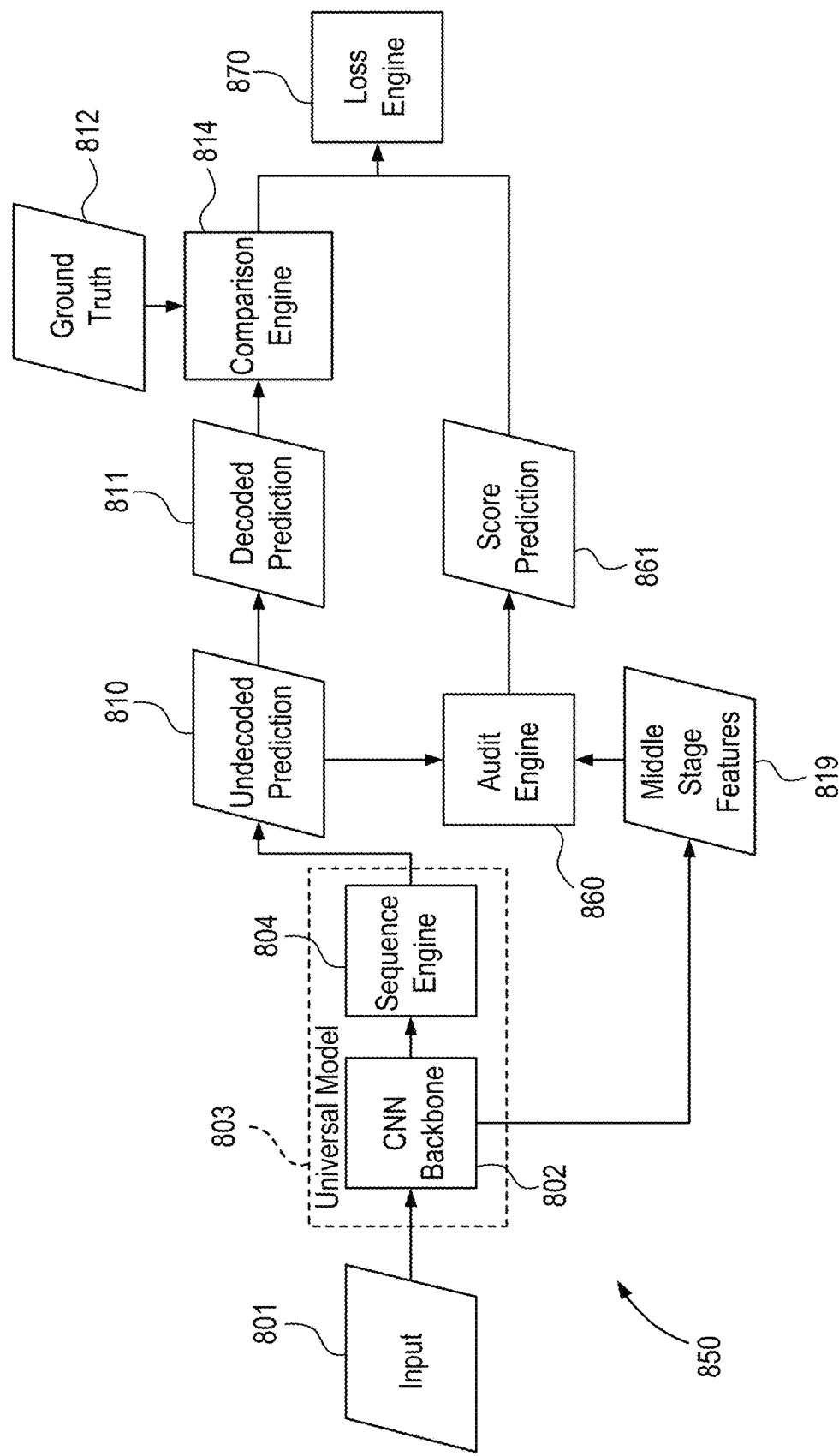
FIG. 8B is a block diagram illustrating the structure of a second example confidence score audit engine, in accordance with some embodiments.

FIG. 8B is a block diagram illustrating the structure of a second example confidence score audit engine 850, in accordance with some embodiments. The confidence score audit engine 850 may be configured to receive an input image 801, e.g., an image of a genealogical record with handwritten information. The confidence score audit engine 850 may be configured to pass the input image 801 to a model 803, e.g., a universal model, configured in some embodiments with a CNN backbone 802 configured to generate one or more feature maps and a sequence engine 804 configured to receive and transform the feature maps.

The sequence engine 804 may include a recurrent neural network ("RNN"), such as an LSTM model. While an RNN is described, it will be appreciated that the disclosure is not limited thereto and any suitable approach may be used. For example, a model configured to transform visual layers into text predictions may be used. Convolutional layers and/or transformer layers may be used.

The sequence engine 804 may be configured to generate one or more predictions, such as one or more undecoded predictions 810. In parallel, previously, subsequently, or simultaneously with the generation of the predictions 810, middle stage features 819, generated and outputted by the CNN backbone 802, may be passed to an audit engine 860. The audit engine 860 may be configured to generate a score prediction, as shown and described in FIG. 8D. Likewise, the audit engine 860 may receive the undecoded predictions 810. The audit engine 860 may be configured to generate a score prediction 861 based on the content of the input image 801, e.g., a prediction of the score of a prediction of the handwriting content of the input image 801 as determined by the handwriting recognition embodiments of the disclosure. The prediction 861 may be generated on the basis of the undecoded prediction 810 and/or the middle stage features 819.

As described above regarding FIG. 8A, the undecoded prediction 810 may be transformed in any suitable manner and/or by any suitable utility to yield a decoded prediction 811. The decoded prediction 811 may be compared in a comparison engine 814 against a manual label 812, which may be referred to as the "ground truth." The comparison engine 814 may determine whether the decoded prediction 811 and the ground truth 812 are the same. The loss or confidence score therebetween may be normalized between 0 and 1. The closer the prediction is to the ground truth 812, the closer the label is to "1." In opposite, a label closer to "0" is applied.

The loss or confidence assessed by the comparison engine 814 may be output to a loss engine 870 along with the score prediction 861 for a comparison therebetween. The loss, as determined by the loss engine 870, may be used to train the confidence score audit engine 850 or components thereof. As above, the loss or confidence may be a BCE loss. In some embodiments, the universal model 803 is trained separately from the audit engine 860. For example, in some embodiments the universal model 803 is trained first, then frozen and used for training the audit engine 860.

Figure 8C:
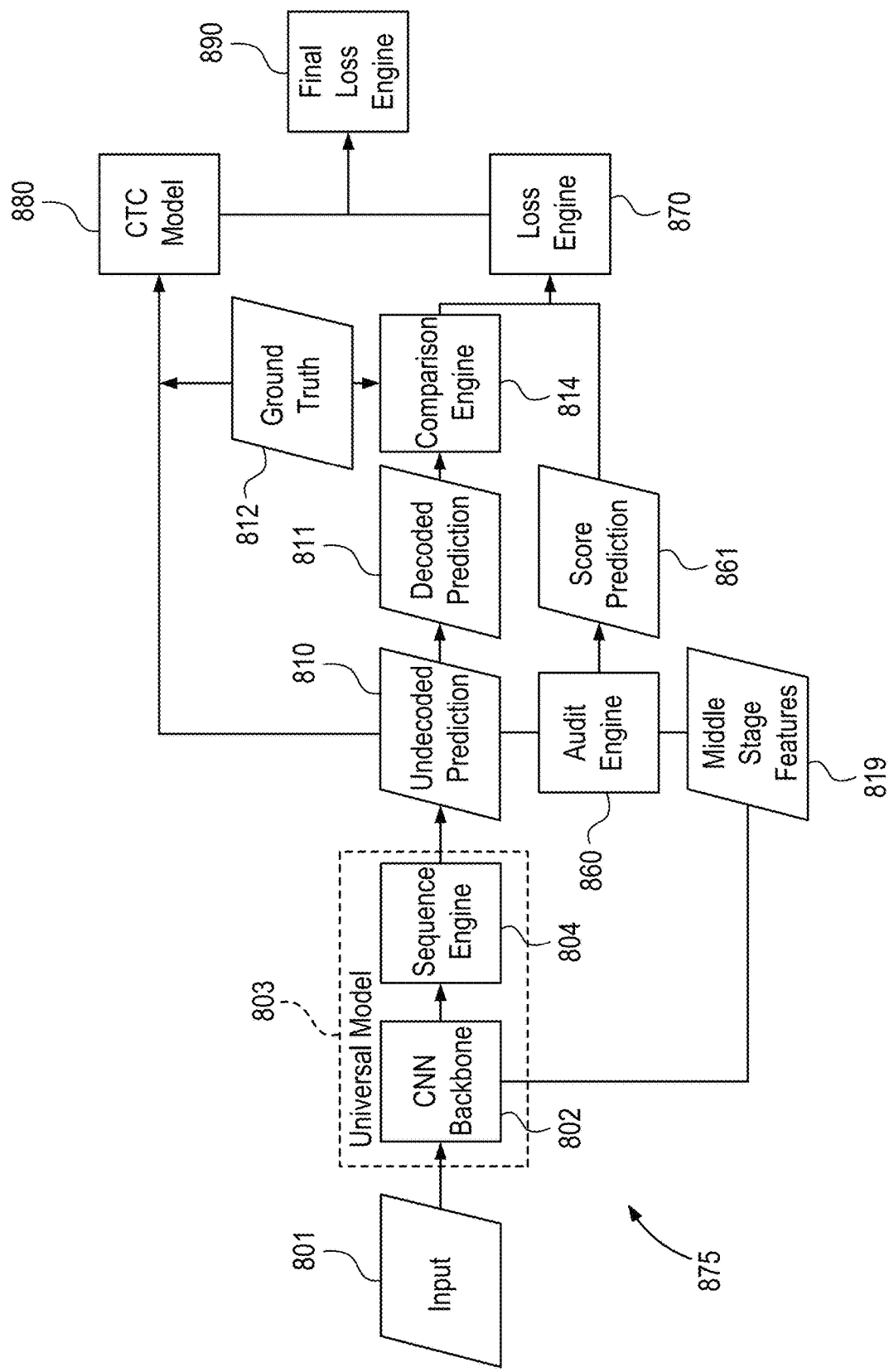
FIG. 8C is a block diagram illustrating the structure of a third example confidence score audit engine, in accordance with some embodiments.

FIG. 8C is a block diagram illustrating the structure of a third example confidence score audit engine 875, in accordance with some embodiments. The confidence score audit engine 875 may include a universal model 803 that includes a CNN backbone 802 and a sequence engine 804, such as an LSTM-based model. The universal model 803 may be configured to receive an input 801, such as an input image of a genealogical record with handwritten information. The universal model 803 may be trained end-to-end with one or more downstream engines, such as an audit engine 860. As discussed above, the CNN backbone 802 may be configured to generate one or more feature maps and the sequence engine 804 may be configured to receive and transform the received feature maps.

The universal model 803 may be configured to output a prediction 810, such as an undecoded prediction 810. Simultaneously, previously, subsequently, and/or in parallel, the CNN backbone 802 may be configured to output one or more middle stage features 819. The middle stage features 819 may be passed to an audit engine 860 that is configured to generate a score prediction 861. As discussed above, the audit engine 860 may be a neural network configured to receive and transform global pooling. The undecoded predictions 810 may be transformed to decoded predictions 811 using any suitable models and compared in a comparison engine 814 against corresponding training labels 812, as described above.

The loss or confidence assessed by the comparison engine 814 may be output to a loss engine 870 along with the score prediction 861 for a comparison therebetween. The loss, as determined by the loss engine 870, may be used to train the confidence score audit engine 875 or components thereof. As above, the loss or confidence may be a BCE loss.

A connectionist temporal classification ("CTC") model 880 may be utilized for a comparison between the manual labels 812 and the undecoded predictions 811. The CTC-based comparison may be performed in parallel to the comparison engine 814. The comparison may entail or be based on a CTC-determined loss. The CTC loss from the CTC model 880 may be summed with, multiplied with, subtracted from, or in any other suitable way compared against the BCE loss from the loss engine 870. A final loss engine 890 determines a resulting final loss as a function of the CTC loss from the CTC model 880 and the BCE loss from the engine 870.

The final loss as determined in the final loss engine 890 may be used to train the models, e.g., the universal model 803 and the loss engine 870, end-to-end, with the final loss back-propagated. This advantageously allows for improved confidence scores and a corresponding reduction in the number of samples off-shored to manual reviewers.

Figure 8D:
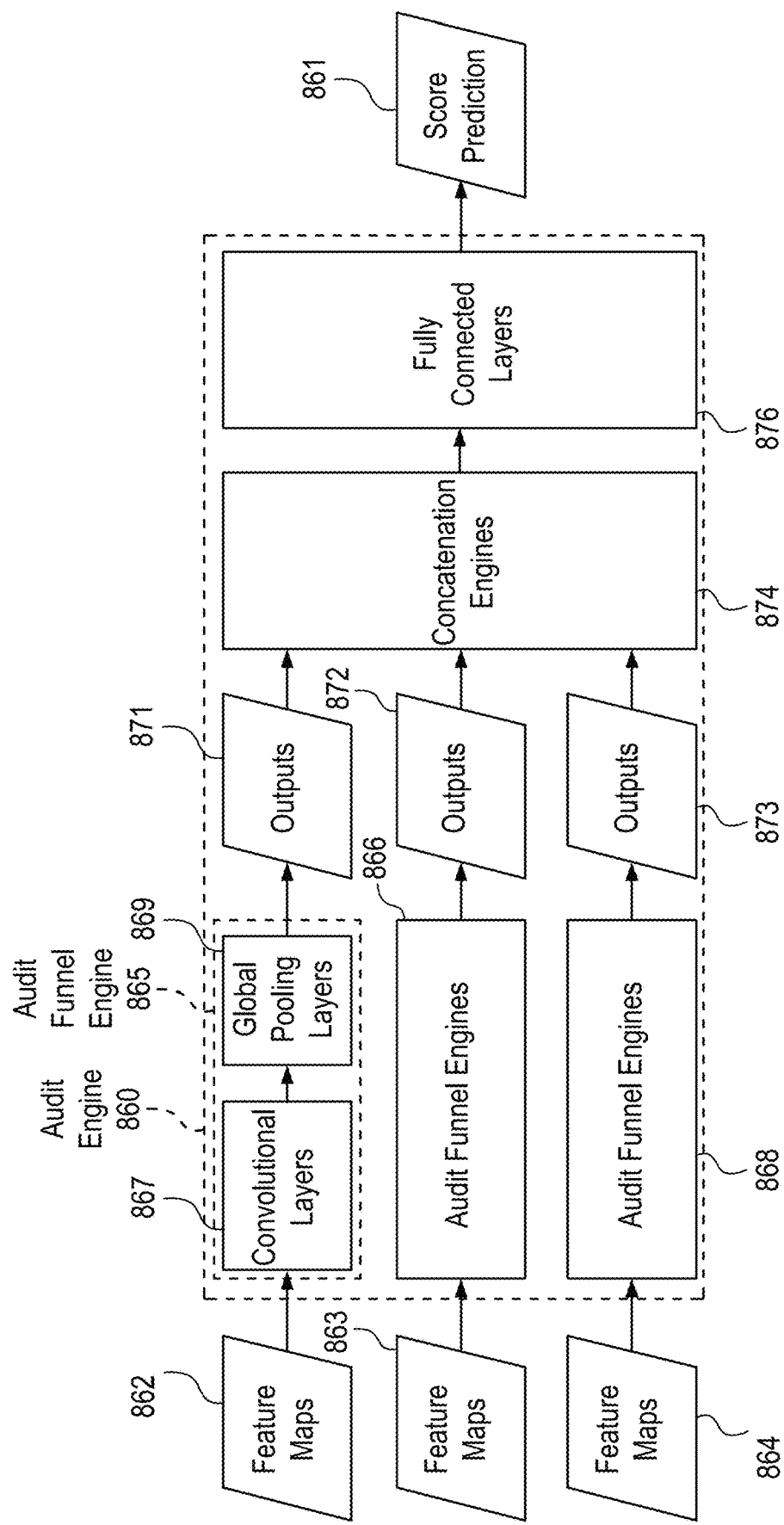
FIG. 8D is a block diagram illustrating the structure of an audit engine, in accordance with some embodiments.

FIG. 8D is a block diagram illustrating the structure of an audit engine 860 that may be used in confidence score audit engine 850 and confidence score audit engine 875, in accordance with some embodiments. The audit engine 860 may be configured to receive one or more feature maps 862, 863, 864 that are generated from different layers of a CNN backbone. The feature maps 862, 863, 864 may correspond respectively to a first feature, a second feature, and an nth feature. The feature maps 862, 863, 864 may be examples of the middle stage features 819 or may be contained within, derived from, or may be distinct from the middle stage features 819. Any suitable number of feature maps may be fed to the score prediction audit engine 860. The feature maps 862, 863, 864 may have different shapes. The feature maps 862 may be sent to an audit funnel engine 865, which may include one or more convolutional layers 867 and/or one or more global pooling layers 869. The feature maps 863, 864 may likewise be sent to corresponding audit funnel engines 866, 868, which may likewise include one or more convolutional layers and/or one or more global pooling layers as described regarding the audit funnel engines 865.

The outputs 871, 872, 873 from the audit funnel engines 865, 866, 868 may be the same size, and/or may be fed to one or more concatenation engines 874. The output from the concatenation engine 874 may be passed to one or more fully connected layers 876, which may be configured to output a final predicted score 861.

Example Handwriting Recognition Models

Figure 9A:
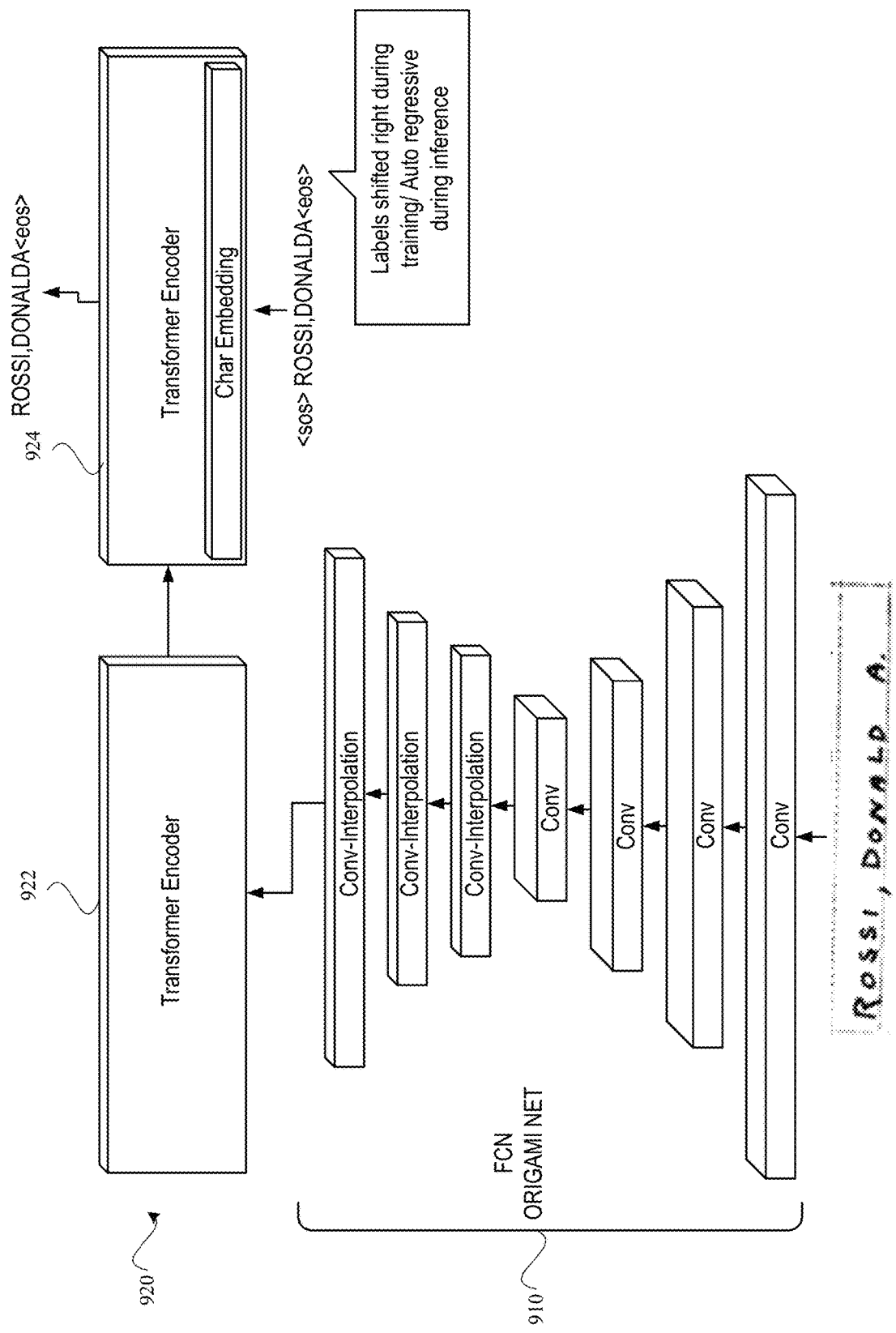
FIG. 9A is a block diagram illustrating the structure of a handwriting recognition model for recognizing handwritten information in a structured form such as a genealogical record, in accordance with some embodiments.

FIG. 9A is a block diagram illustrating the structure of a handwriting recognition model 900 for recognizing handwritten information in a structured form such as a genealogical record, in accordance with some embodiments. For example, the handwriting recognition model 900 may be used to recognize one or more fields in a divided area of a genealogical record. The handwriting recognition model 900 may be specialized in recognizing names, occupations and industries (NOI) as well as other fields in a genealogical record. In some embodiments, the handwriting recognition model 900 may also be referred to as an NOI model and may be an example of one of the candidate handwriting recognition models used in step 640 of the process 600. The handwriting recognition model 900 may be trained using training samples that are or comprise names, occupations, and industries and may include specific vocabulary such as different names that may not be common words found in a generic corpus.

The handwriting recognition model 900 may include a convolutional neural network ("CNN") 910 and a transformer 920. The transformer 920 may include an encoder 922 and a decoder 924. The CNN 910 may include one or more convolution layers and one or more interpolation layers. The CNN 910 may be configured to output one or more feature maps that account for multiple-line images, such as fields that have more than one line. For example, in a census record, a name or description entered by an enumerator may exceed the length of the cell and the Enumerator starts a second or third line. The CNN 910 may be configured to collapse the text in a multiline field into a single line. In some embodiments, the feature maps outputted by CNN 910 may also be used as middle stage features 819 for confidence score audit engine 850, confidence score audit engine 875 and audit engine 860.

In some embodiments, OrigamiNet or a modification thereof may be used as a backbone, option, or component for CNN 910, but other suitable CNN structures (such as those trained or based on ResNet), neural networks, models, components, or otherwise likewise may be used in various embodiments. In some embodiments, the encoder-decoder architecture of the transformer 920 helps modeling of the dependencies between characters which can help in capturing the language intricacies.

In some embodiments, the encoder 922 and decoder 924 of the transformer 920 may be configured as a two-layer encoder and decoder, respectively, in contrast to conventional approaches where transformers have many layers. In some embodiments, a two-layer arrangement is a counterintuitive choice for this challenging application as these are usually used for free-form text rather than context-specific and difficult-to-predict names, industries, and occupations. It has been surprisingly found that the use of the transformer 920 advantageously facilitates providing context for interpreting difficult-to-predict letters, which often occurs in historical records. In various embodiments, the transformer 920 is not limited to two-layer encoders or decoders, but rather may include any suitable number of layers in the encoder and the decoder.

The encoder 922 may capture the features in a latent space of the CNN 910. To account for multiline characters a CNN based on OrigamiNet may be used. The decoder 924 is based on the transformer architecture which uses the encoded features and generates characters. In some embodiments, the decoder 924 may take the form of an autoregressive decoder which generates characters based on the previous characters and also uses the encoded features. The encoder-decoder transformer-based architecture not only facilitates capturing dependencies among one or more features in a character, but also may facilitate capturing dependencies among different characters in predicting a character.

In some embodiments, the handwriting recognition model 900 may be combined with an audit model as discussed in FIG. 8A through FIG. 8D to generate a confidence score for the prediction. The handwriting recognition model 900 may be combined in any of the confidence score audit engines described in FIG. 8A through FIG. 8D.

Figures 9B, 9C:
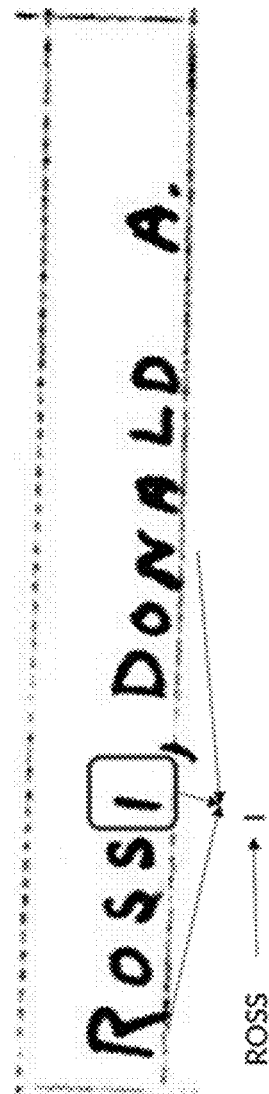
FIG. 9B is an example handwritten name in a genealogical record.
FIG. 9C is a conceptual diagram illustrating an application of the handwriting recognition model, in accordance with some embodiments.

FIG. 9B is an example handwritten name in a genealogical record. As seen in the example of FIG. 9B, the handwriting recognition model 900 may be configured to predict the letter "i" in the sample based not only on the feature vector or portion of a feature vector corresponding directly to "i," but also to account for context, such as the fact that a capital "R" precedes "i," that an "n" follows the "i," and so on. Training of the handwriting recognition model 900 may be performed in light of a learned vocabulary or ontology for name-, occupation-, and/or industry-specific names, words, patterns, or otherwise determined from training data and used for tuning one or more weights of the model.

The encoder 922 may be configured to determine weights for different image regions. In some embodiments, for "i," in FIG. 9B, greater weight may be assigned to regions immediately adjacent to the "i," such as the "s" preceding the "i," than to weights for image regions corresponding to the capital "R."

Further, the combination of a light transformer 920 with an OrigamiNet-backbone CNN 910 is a counterintuitive and novel combination that allows for a transformative effect on historical records, where context is important in fields like names, occupations, and industries and multi-line fields abound. Despite its structural simplicity and resulting computational economies, the handwriting recognition model 900 may possess remarkably accurate performance even on difficult tasks like predicting names.

FIG. 9C is a conceptual diagram illustrating an application of the handwriting recognition model 900, in accordance with some embodiments. As shown in FIG. 9C, various fields may be predicted with surprising accuracy, such as a multiline handwritten field including "retail merchant store," where the enumerator apparently ran out of room to include "store" and so started a second line above the first line, counterintuitively. This prediction task may be performed alongside single-line predictions, such as creamery, telephone office, and carpenter. Each of these fields advantageously may include a confidence score associated with the prediction. For example, the confidence score may be generated by an audit model as discussed in FIG. 8A through FIG. 8D.

Thus, not only is the handwriting recognition model 900 configured and enabled to handle multi-line fields, but also to do so while accounting for context, such as industry- or occupation-specific weights (based on the appearance of such data in training data), which allows for accurately interpreting the handwritten word "store" in light of the prediction regarding "retail" which appears earlier in the field. A specific ontology may be determined and utilized for one or more of the fields including names, occupations, and industries. As the handwriting recognition model 900 proceeds to interpret a field, any image region may be interpreted differently in light of the other image regions, rather than proceeding linearly as is done in existing approaches.

The handwriting recognition model 900 may be applied to recognizing names, occupations, and/or industries, but the handwriting recognition model 900 is not limited to recognizing handwriting in those fields. Rather, the architecture of handwriting recognition model 900 may be applied to any suitable field of any suitable handwriting recognition task.

The transformer 920 may be configured to recognize vocabulary specific to pertinent fields, such as names, occupations, and/or industries. Training of the handwriting recognition model 900 may be performed using labeled data, such as data from a similar genealogical collection. For example, for genealogical records for the 1950 U.S. Census, the handwriting recognition model 900 may be trained on 1940 U.S. Census labeled data as "ground truth." This allows the handwriting recognition model 900 to recognize and predict the specific context of how names, occupations, and industries frequently appear in the population, thereby allowing the model to accurately and efficiently use cultural and/or other context to predict a text output from a handwriting sample. Further, the model predictions are not limited to a specific ontology, e.g. the 1940 U.S. Census, but rather may be configured to detect any new names or words that are not part of the ontology.

Figure 9D:
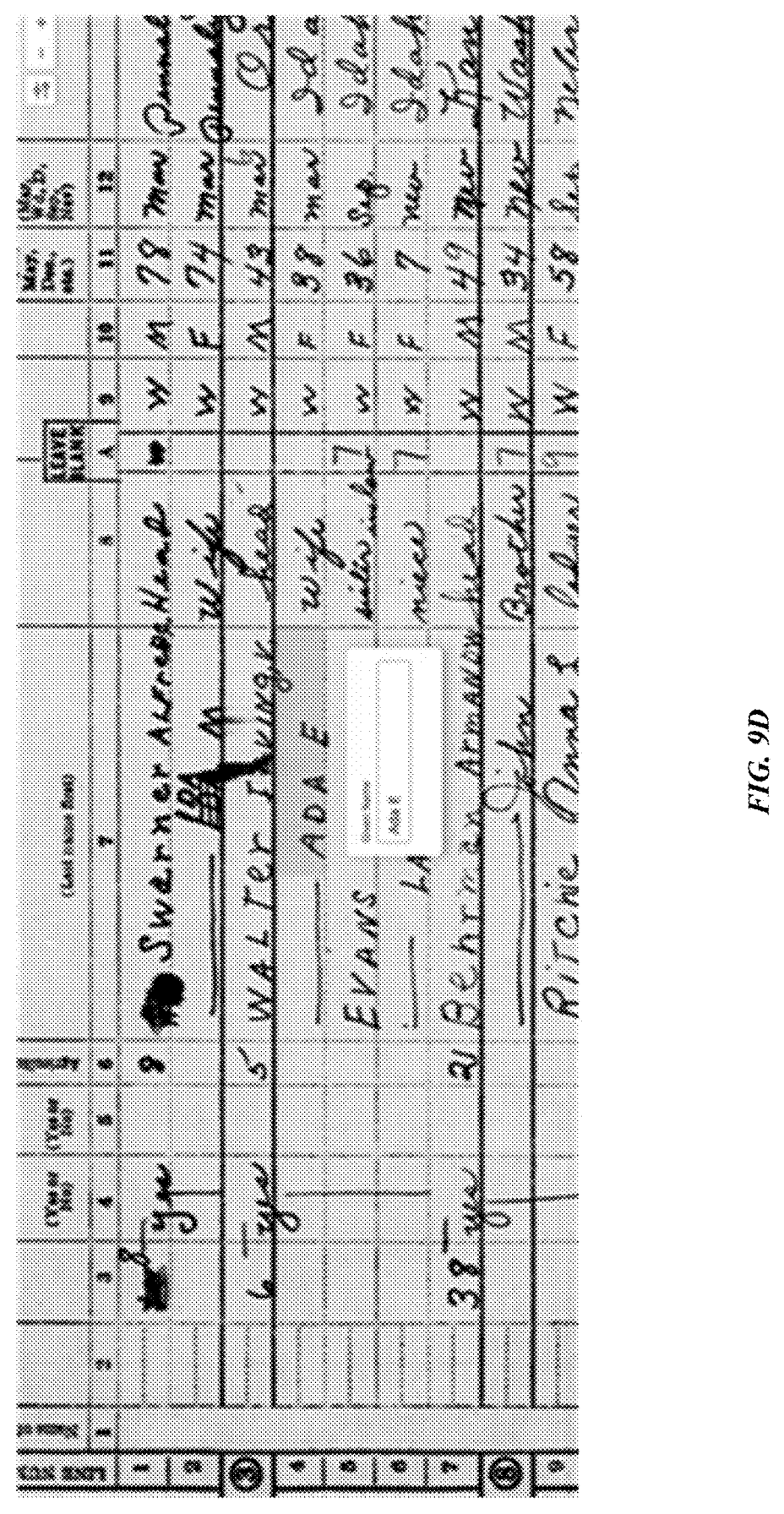

In some embodiments, a challenge during training for names may include the challenge of interpreting prefixes and suffixes of a name. FIG. 9D is an example historical genealogical record that may be a divided area of a census record. As seen in FIG. 9D, the handwriting recognition model 900 is able to detect where a blank, hyphen, or other line was added by an enumerator, and learns that the hyphen corresponds to a name of an adjacent or nearby family member. For example, Ada E shares a surname (Walter) with her husband Irving, which may be made clear in manual labels accompanying the training images.

While a similar genealogical record collection such as a previous census record collection has been described as a source of training data, it will be appreciated that any suitable model type, including unsupervised and/or deep learning approaches, and other suitable training samples may be alternatively or additionally used.

Figure 10:
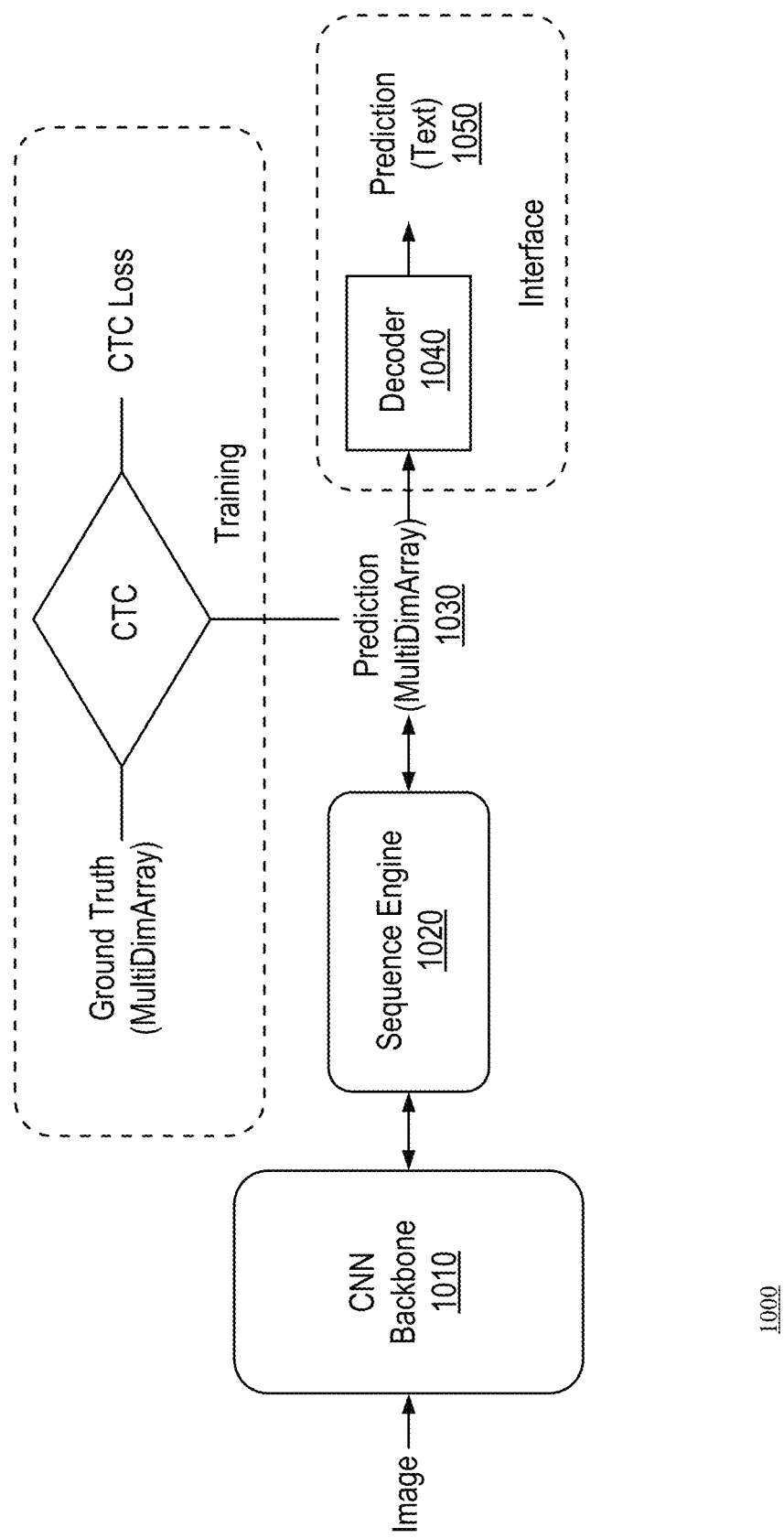
FIG. 10 is a block diagram illustrating the structure of a handwriting recognition model for recognizing handwritten information in a structured form such as a genealogical record, in accordance with some embodiments.

FIG. 10 is a block diagram illustrating the structure of a handwriting recognition model 1000 for recognizing handwritten information in a structured form such as a genealogical record, in accordance with some embodiments. For example, the handwriting recognition model 1000 may be used to recognize one or more fields in a divided area of a genealogical record. The handwriting recognition model 1000 may be a general model that is developed to handle numeric, alphabetic, and/or alphanumeric fields. In some embodiments, the handwriting recognition model 1000 may also be referred to as a generic model and may be an example of one of the candidate handwriting recognition models used in step 640 of the process 600.

In some embodiments, the handwriting recognition model 1000 may include a CNN backbone 1010 and a sequence engine 1020, which may take the form of a bi-directional LSTM. The CNN backbone 1010 may include one or more convolution layers, pooling layers, and interpolation layers. In some embodiments, the CNN backbone 1010 may have a structure similar to the CNN 910 in the handwriting recognition model 900. Given an image, the CNN backbone 1010 may extract visual features. The CNN backbone 1010 may be consistent with multiple VGG blocks and residual blocks. The visual feature outputs are passed to the sequence engine 1020. The sequence engine 1020 may convert image features into CTC-based (Connectionist Temporal Classification) sequence logits. For example, in some embodiments, a handwritten word is broken down spatially into multiple spatial regions such as columns. The visual features of each column are analyzed by CNN backbone 1010 and one or more sequences of character strings that have characters corresponding to the columns are generated by the sequence engine 1020. The output of the sequence engine 1020 may be a multi-dimensional array that is the prediction 1030 of the sequence engine 1020.

In some embodiments, during training, the handwriting recognition model 1000 is trained by minimizing the CTC loss, which may be calculated by comparing the sequence logits with ground truth text. The ground truth text may be encoded as a matrix instead of raw text. The handwriting recognition model 1000 is iteratively trained to adjust the weights of the nodes and layers in the CNN backbone 1010 and/or sequence engine 1020 to reduce the CTC loss. The training samples may be a genealogical record collection that has been manually analyzed and that is similar to the genealogical records to be analyzed. For example, for census records of a particular decade, training samples may be the census records of a previous decade.

In some embodiments, the prediction 1030 is passed to a decoder 1040 to decode the sequence logits into string text 1050, which is the prediction of the text. In some embodiments, a CTC greedy decoder may be used to convert the prediction from the encoded version to plain text. The decoder 1040 may also be a beam-search-based decoder but a CTC greedy decoder may be much faster. In some specific fields, such as fields that have only limited options of text (e.g., marital status, citizenship, etc.), a word-beam-search decoder may be used to force the decoded text to one of the words that are pre-defined in a dictionary.

In some embodiments, the handwriting recognition model 1000 may be combined with an audit model as discussed in FIG. 8A through FIG. 8D to generate a confidence score for the string text 1050 prediction. The handwriting recognition model 1000 may be combined in any of the confidence score audit engines described in FIG. 8A through FIG. 8D.

Figure 11A:
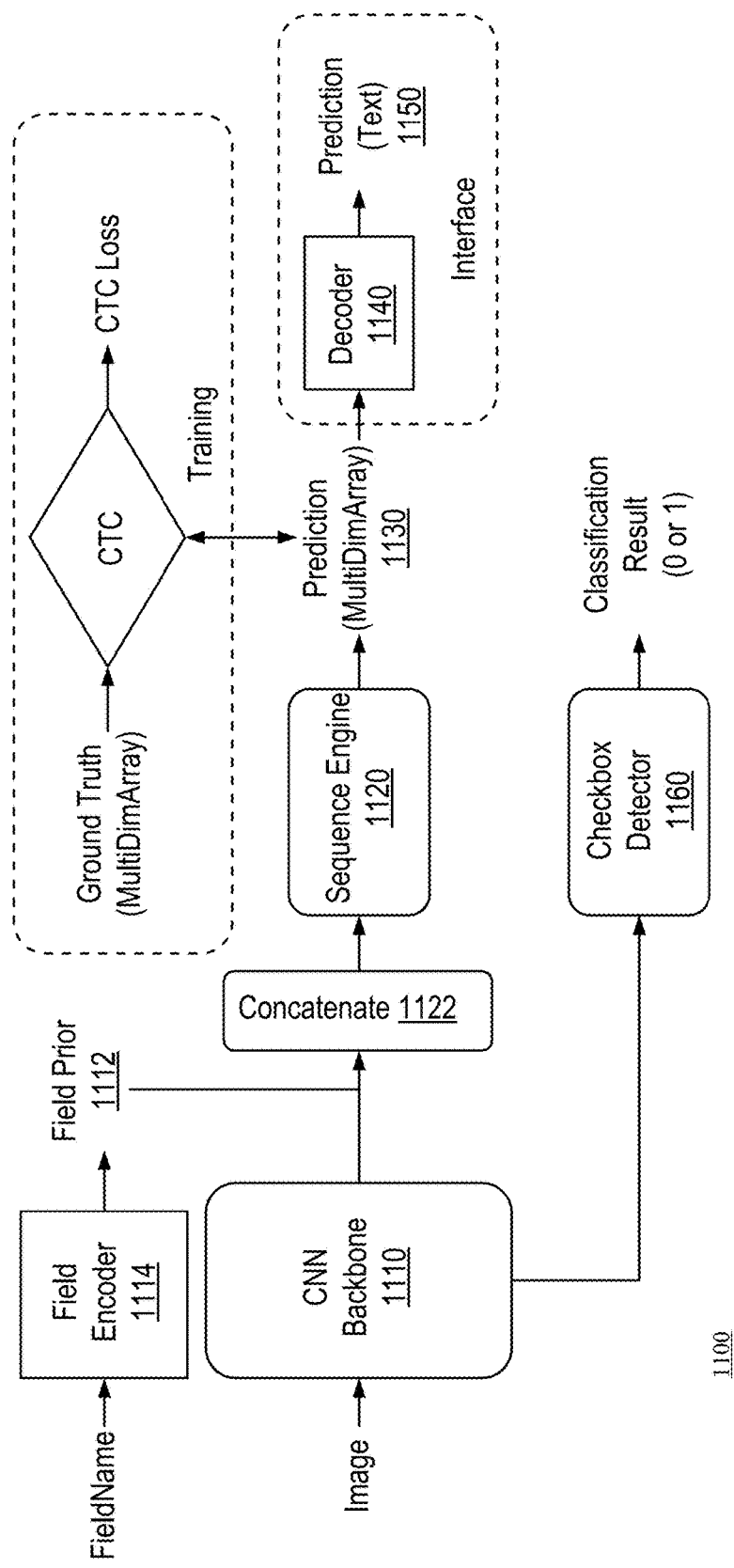
FIG. 11A is a block diagram illustrating the structure of a handwriting recognition model for recognizing handwritten information in a structured form such as a genealogical record, in accordance with some embodiments.

FIG. 11A is a block diagram illustrating the structure of a handwriting recognition model 1100 for recognizing handwritten information in a structured form such as a genealogical record, in accordance with some embodiments. For example, the handwriting recognition model 1100 may be used to recognize one or more fields in a divided area of a genealogical record. In some embodiments, the handwriting recognition model 1100 may be an example of one of the candidate handwriting recognition models used in step 640 of the process 600.

Figure 11B:
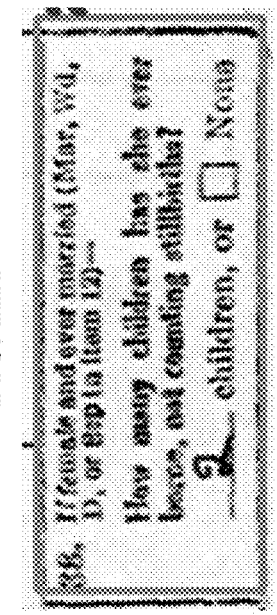
FIG. 11B is an image of a field that has a relatively large number of machine-printed labels.

The handwriting recognition model 1100 may be referred to as a machine-labeled model that is developed to improve the prediction of handwriting that is in the fields containing a relatively large number of machine-printed labels. For example, FIG. 11B is an image of a field that has a relatively large number of machine-printed labels. The machine-printed labels are usually fixed among different genealogical records and can be relatively easy to recognize with accuracy. Since the machine-printed labels may be recurring, the machine-printed labels may be predetermined and saved in a database. In FIG. 11B, the handwriting is surrounded by machine-printed labels. The box before "None" could be checked or empty and the line before "children" could be filled with a number, a word, or empty. The handwriting recognition model 1100 may be used to recognize the handwriting "2" that was filled in manually and to recognize that the box before "None" is empty.

In some embodiments, the handwriting recognition model 1100 may be a variant of the handwriting recognition model 1000. In addition to the components shown in the handwriting recognition model 1000, a field prior 1112 may be added to provide extra information about the input field. For example, if most handwritings of a specific field are state names, with this field prior 1112, the handwriting recognition model 1100 is more likely to predict a state name if the handwriting recognition model 1100 knows the input belongs to this specific field. The input of the sequence engine 1120 is the concatenation 1122 between the output of the CNN backbone 1110 and the field prior 1112. The field prior 1112 may be generated by a field encoder 1114 that receives the field name. The field name may be the machine-printed labels or part of the machine-printed labels.

Similar to the handwriting recognition model 1000, the sequence engine 1120 may generate sequence logits that may take the form of a multi-dimensional array. The sequence logits are prediction 1130. The prediction 1130 is generated with the factors of the field prior 1112 taken into consideration. For example, the field prior 1112 may provide information related to the machine-printed labels surrounding the handwritten information. As machine-printed fields are often context-specific, the field prior 1112 may also provide information on the choice of words that are likely to be in the handwriting.

During training, the handwriting recognition model 1100 may be trained by minimizing the CTC loss, which may be calculated by comparing the sequence logits with ground truth text. The ground truth text may be encoded as a matrix instead of raw text. The handwriting recognition model 1100 is iteratively trained to adjust the weights of the nodes and layers in the CNN backbone 1110 and sequence engine 1120 to reduce the CTC loss. The training samples may be a genealogical record collection that has been manually analyzed and that is similar to the genealogical records to be analyzed. For example, for census records of a particular decade, training samples may be the census records of a previous decade. In inference, the multi-dimensional array prediction 1130 may be passed to a decoder 1140 to decode the sequence logits into text prediction 1150.

Figure 12A:
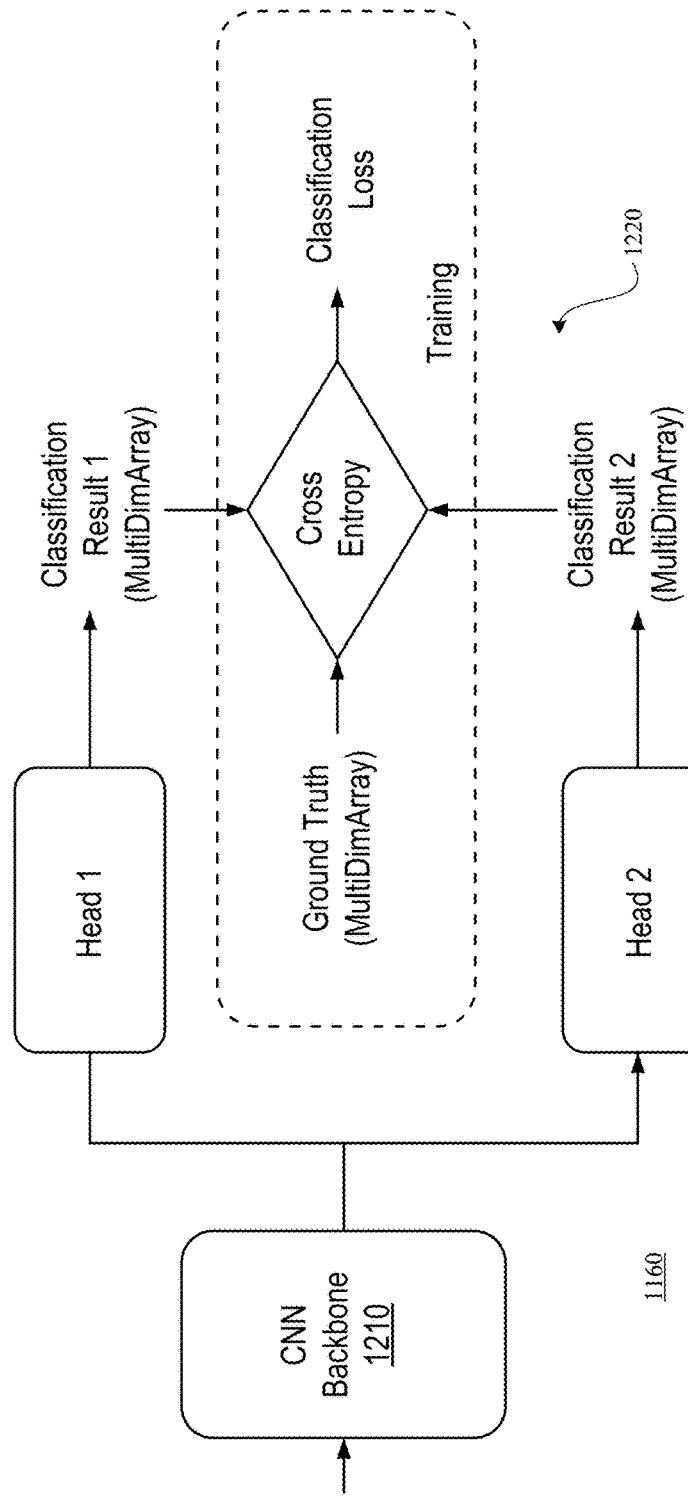
FIG. 12A is a block diagram illustrating the structure of a checkbox detector for identifying a checkbox and determining whether the checkbox is checked, in accordance with some embodiments.

The handwriting recognition model 1100 may include a checkbox detector 1160, which is configured to identify a checkbox and predict whether the checkbox is checked. The checkbox detector 1160 may include a binary classifier to perform the task of predicting whether the checkbox is checked. An example of binary classifier is shown in FIG. 12A. In some embodiments, the checkbox detector 1160 may be trained together or separately with the main text recognition components (e.g., the CNN backbone 1110 and sequence engine 1120). In some embodiments, the checkbox detector 1160 is trained after the completion of the main model. During inference, a post-processor may replace the transcription output as "none" only if the transcription is empty and the classification result predicting that the checkbox is not checked is higher than a threshold.

In some embodiments, the handwriting recognition model 1100 may be combined with an audit model as discussed in FIG. 8A through FIG. 8D to generate a confidence score for the text prediction. The handwriting recognition model 1100 may be combined in any of the confidence score audit engines described in FIG. 8A through FIG. 8D.

Figure 12B:
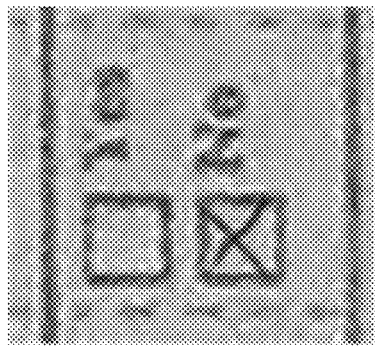
FIG. 12B is an example of a checkbox.

FIG. 12A is a block diagram illustrating the structure of a checkbox detector 1160 for identifying a checkbox and determining whether the checkbox is checked in a structured form such as a genealogical record, in accordance with some embodiments. FIG. 12B is an example of a checkbox as it may appear in a genealogical record. In some embodiments, the checkbox detector 1160 may also be referred to as a checkbox model and may be an example of one of the candidate handwriting recognition models used in step 640 of the process 600. The checkbox detector 1160 may be a stand-alone model to detect handwritten information in divided areas that include one or more checkboxes. The checkbox detector 1160 may also be incorporated into another handwriting recognition model such as the handwriting recognition model 1100 to detect specific components within a field.

The checkbox detector 1160 may include a CNN backbone 1210 that is used to analyze the image and identify the locations of checkboxes and a binary classifier 1220 that determines whether an identified checkbox is checked. During training, the checkbox detector 1160 is trained by minimizing the cross-entropy loss, which may be calculated by comparing the prediction of whether an identified checkbox is checked with the ground truth. For example, the training samples may include images of checkboxes with manually identified ground truth that labels whether the checkboxes in the images are checked. The checkbox detector 1160 is iteratively trained to adjust the weights of the nodes and layers in the CNN backbone 1210 and the binary classifier 1220 to reduce the error in predicting whether the checkboxes in the training samples are checked. The training samples may be a genealogical record collection that has been manually analyzed and that is similar to the genealogical records to be analyzed. For example, for census records of a particular decade, training samples may be the census records of a previous decade.

In some embodiments, the checkbox detector 1160 may be combined with an audit model as discussed in FIG. 8A through FIG. 8D to generate a confidence score for the checkbox prediction. The checkbox detector 1160 may be combined in any of the confidence score audit engines described in FIG. 8A through FIG. 8D.

Figure 13:
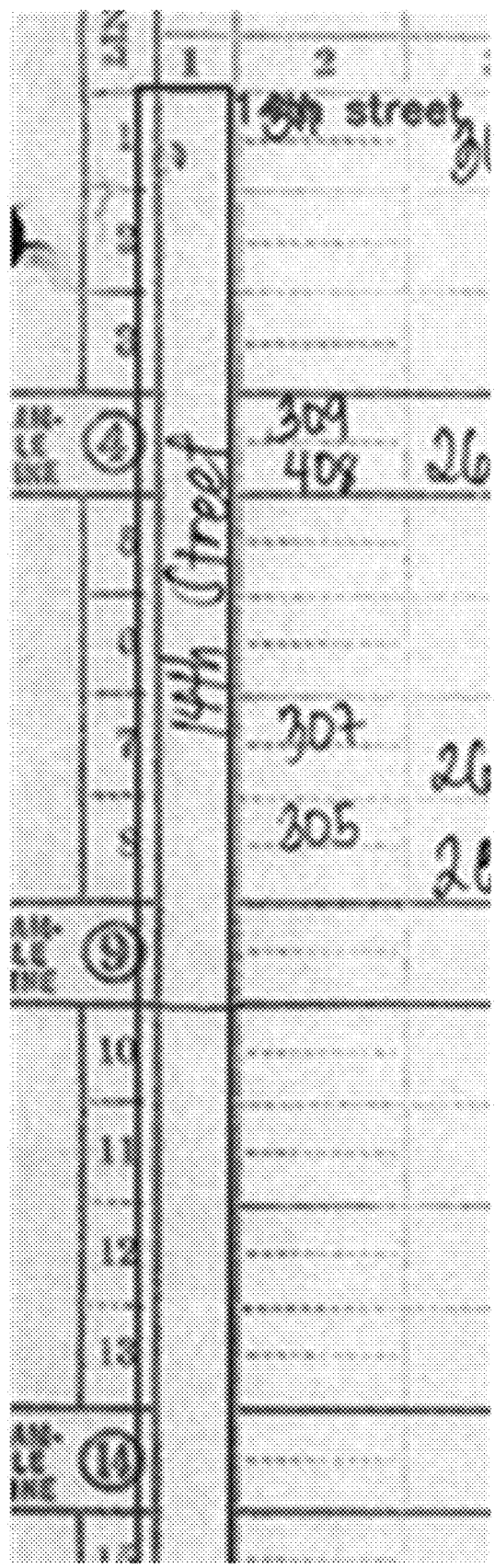
FIG. 13 is an example image of a genealogical record that has text written in a direction different from the majority of the text.

FIG. 13 is an example image of a genealogical record that has text written in a direction different from the majority of the text. For example, in some records, the street names are written vertically while the rest of the text is written horizontally. The text that is orthogonal to the majority of the text may be recognized by another handwriting recognition model that may have a similar structure as the handwriting recognition model 1000, but with a pre-processing stage that rotates the image by 90 degrees. In some embodiments, the handwriting recognition model that identifies the orthogonal text may be an example of one of the candidate handwriting recognition models used in step 640 of the process 600. Similar to other models, the model can also be combined with an audit model.

Example Model Training

In various embodiments, a wide variety of machine learning techniques may be used. Examples include different forms of neural networks, including convolutional neural networks (CNN), recurrent neural networks (RNN) and long short-term memory networks (LSTM). Various examples of machine learning pipelines and models that are used to divide a record into areas, to recognize the handwriting information, and to generate confidence scores of the prediction are described in FIG. 7A through FIG. 13.

In various embodiments, the training techniques for a machine learning model may be supervised, semi-supervised, or unsupervised. In supervised learning, the machine learning models may be trained with a set of training samples that are labeled. For example, for a machine learning model trained to detect handwritten text, the training samples may be different images of handwritten text labeled with the text that is previously identified (e.g., manually by a person). The labels for each training sample may be sequences, encoded sequences, words, binary labels or multi-class labels. In some cases, an unsupervised learning technique may be used. The samples used in training are not labeled. Various unsupervised learning techniques such as clustering may be used. In some cases, the training may be semi-supervised with a training set having a mix of labeled samples and unlabeled samples.

A machine learning model may be associated with an objective function, which generates a metric value that describes the objective goal of the training process. For example, the training may intend to reduce the error rate of the model in generating predictions of text. In such a case, the objective function may monitor the error rate of the machine learning model. In handwriting recognition, the objective function of the machine learning algorithm may be the training error rate in recognizing text in a training set. Such an objective function may be called a loss function or simply loss. Other forms of objective functions may also be used, particularly for unsupervised learning models whose error rates are not easily determined due to the lack of labels.

Figure 14:
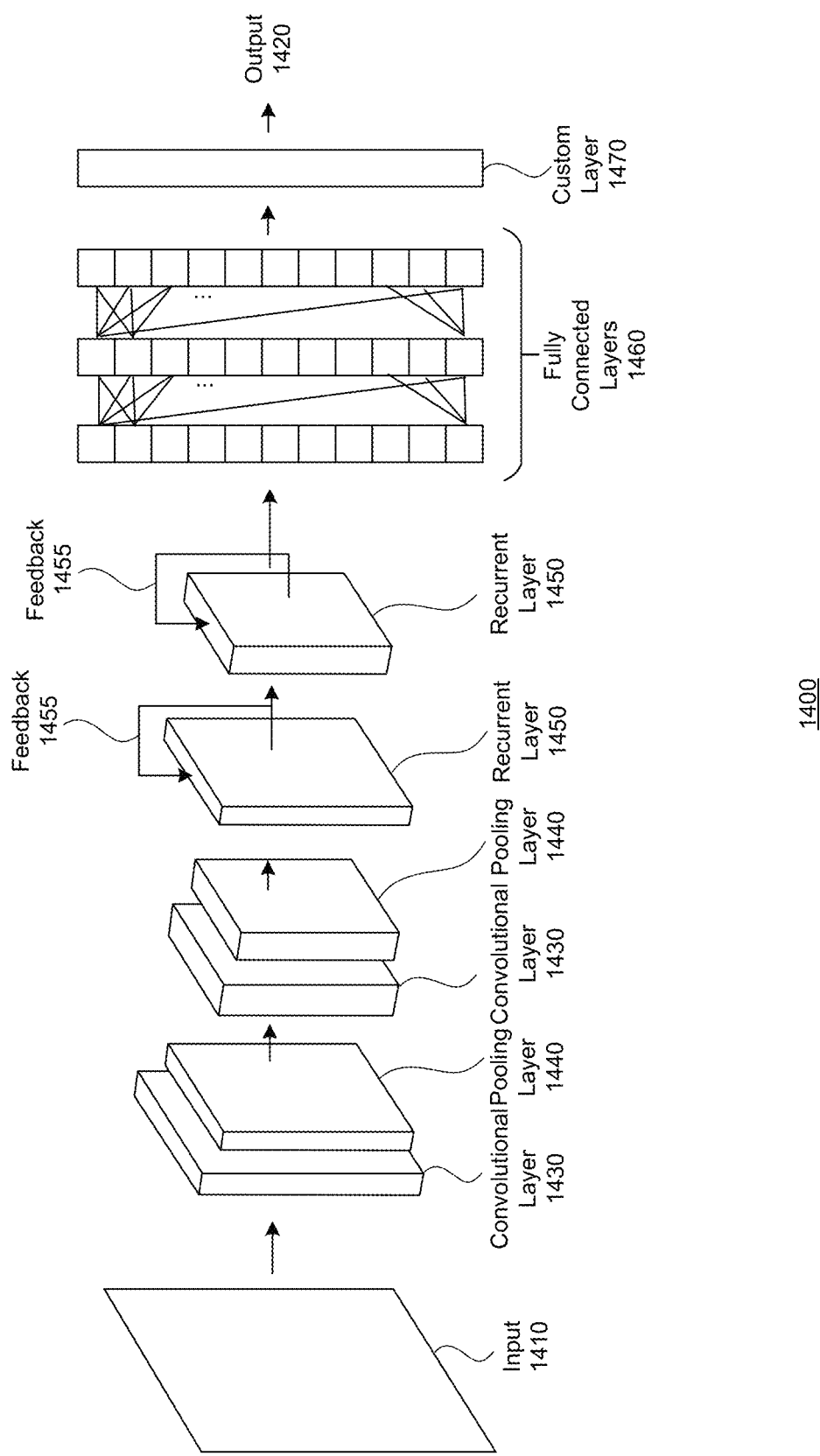
FIG. 14 is a block diagram illustrating a structure of an example neural network, in accordance with some embodiments.

Referring to FIG. 14, a structure of an example neural network is illustrated, according to an embodiment. The neural network 1400 may receive an input 1410 and generate an output 1420. The neural network 1400 may include different kinds of layers, such as convolutional layers 1430, pooling layers 1440, recurrent layers 1450, full connected layers 1460, and custom layers 1470. A convolutional layer 1430 convolves the input of the layer (e.g., an image) with one or more kernels to generate different types of images that are filtered by the kernels to generate feature maps. Each convolution result may be associated with an activation function. A convolutional layer 1430 may be followed by a pooling layer 1440 that selects the maximum value (max pooling) or average value (average pooling) from the portion of the input covered by the kernel size. The pooling layer 1440 reduces the spatial size of the extracted features. In some embodiments, convolutional layers 1430 and pooling layers 1440 may be followed by recurrent layers 1450 that include one or more feedback loops 1455. The feedback 1455 may be used to account for spatial relationships of the features in an image or sequential relationships of the identified characters in an image. The layers 1430, 1440, and 1450 may be followed in multiple fully connected layers 1460 that have nodes (represented by squares in FIG. 14) connected to each other. The fully connected layers 1460 may be used for classification and object detection. In one embodiment, one or more custom layers 1470 may also be presented for the generation of a specific format of output 1420. For example, a custom layer may be encoders as described in various handwriting recognition models 900, 1000, and 1100.

The order of layers and the number of layers of the neural network 1400 in FIG. 14 is for example only. In various embodiments, a neural network 1400 includes one or more convolutional layer 1430 but may or may not include any pooling layer 1440 or recurrent layer 1450. If a pooling layer 1440 is present, not all convolutional layers 1430 are always followed by a pooling layer 1440. A recurrent layer may also be positioned differently at other locations of the CNN. For each convolutional layer 1430, the sizes of kernels (e.g., 3×3, 5×5, 7×7, etc.) and the numbers of kernels allowed to be learned may be different from other convolutional layers 1430.

A machine learning model may include certain layers, nodes, kernels and/or coefficients. Training of a neural network, such as the neural network 1400, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. The machine learning model may be iteratively trained using multiple rounds of forward propagation and backpropagation to adjust the weights of the model to increase or decrease the value of the objective function. Training may be completed when the objective function has become sufficiently stable (e.g., the machine learning model has converged) or after a predetermined number of rounds for a particular set of training samples. The trained machine learning model can be used for performing an inference task described in this disclosure.

Computing Machine Architecture

Figure 15:
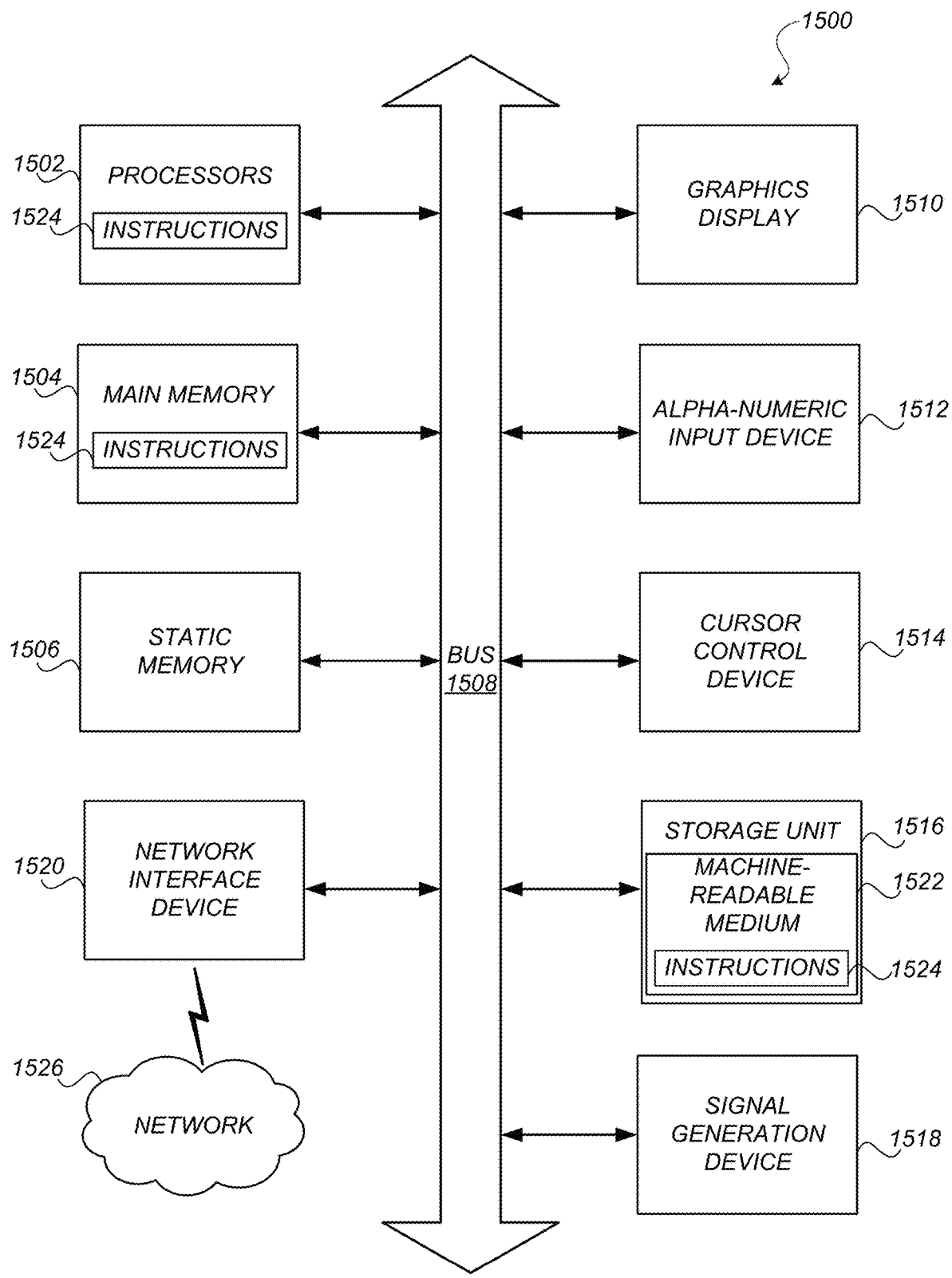
FIG. 15 is a block diagram of an example computing device, in accordance with some embodiments.

FIG. 15 is a block diagram illustrating components of an example computing machine that is capable of reading instructions from a computer-readable medium and execute them in a processor (or controller). A computer described herein may include a single computing machine shown in FIG. 15, a virtual machine, a distributed computing system that includes multiples nodes of computing machines shown in FIG. 15, or any other suitable arrangement of computing devices.

By way of example, FIG. 15 shows a diagrammatic representation of a computing machine in the example form of a computer system 1500 within which instructions 1524 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 15 may correspond to any software, hardware, or combined components shown in FIGS. 1 and 2, including but not limited to, the client device 110, the computing server 130, and various engines, interfaces, terminals, and machines shown in FIG. 2. While FIG. 15 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1524 that specify actions to be taken by that machine. Further, while only a single machine is illustrated, the term "machine" and "computer" may also be taken to include any collection of machines that individually or jointly execute instructions 1524 to perform any one or more of the methodologies discussed herein.

The example computer system 1500 includes one or more processors 1502 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1500 may also include a memory 1504 that store computer code including instructions 1524 that may cause the processors 1502 to perform certain actions when the instructions are executed, directly or indirectly by the processors 1502. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1502 and reduces the space required for the memory 1504. For example, the handwriting recognition techniques and machine learning methods described herein reduce the complexity of the computation of the processors 1502 by applying one or more novel techniques that simplify the steps in training, reaching convergence, and generating results of the processors 1502. The algorithms described herein also reduces the size of the models and datasets to reduce the storage space requirement for memory 1504.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1500 may include a main memory 1504, and a static memory 1506, which are configured to communicate with each other via a bus 1508. The computer system 1500 may further include a graphics display unit 1510 (e.g., a plasma display panel (PDP), a liquid crystal display (LCD), a projector, or a cathode ray tube (CRT)). The graphics display unit 1510, controlled by the processors 1502, displays a graphical user interface (GUI) to display one or more results and data generated by the processes described herein. The computer system 1500 may also include alphanumeric input device 1512 (e.g., a keyboard), a cursor control device 1514 (e.g., a mouse, a trackball, a joystick, a motion sensor, or other pointing instrument), a storage unit 1516 (a hard drive, a solid state drive, a hybrid drive, a memory disk, etc.), a signal generation device 1518 (e.g., a speaker), and a network interface device 1520, which also are configured to communicate via the bus 1508.

The storage unit 1516 includes a computer-readable medium 1522 on which is stored instructions 1524 embodying any one or more of the methodologies or functions described herein. The instructions 1524 may also reside, completely or at least partially, within the main memory 1504 or within the processor 1502 (e.g., within a processor's cache memory) during execution thereof by the computer system 1500, the main memory 1504 and the processor 1502 also constituting computer-readable media. The instructions 1524 may be transmitted or received over a network 1526 via the network interface device 1520.

While computer-readable medium 1522 is shown in an example embodiment to be a single medium, the term "computer-readable medium" should be taken to include a single medium or multiple media (e.g., a centralized or distributed database, or associated caches and servers) able to store instructions (e.g., instructions 1524). The computer-readable medium may include any medium that is capable of storing instructions (e.g., instructions 1524) for execution by the processors (e.g., processors 1502) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes:: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, and (6) U.S. Patent Publication Application No., entitled "Linking Individual Datasets to a Database," US2021/0216556, published on Jul. 15, 2021.

What is claimed is:

1. A computer-implemented method, comprising:
    receiving a genealogical record, the genealogical record being an image of a physical form having a structured layout and a plurality of fields, the physical form having handwritten information;
    dividing the genealogical record into a plurality of areas based on the structured layout;
    identifying, for a particular area, a type of a field that is included within the particular area;
    selecting, from a set of candidate handwriting recognition models, a handwriting recognition model for identifying the handwritten information in the particular area, the handwriting recognition model selected based on the type of the field included within the particular area;
    inputting an image of the particular area to the handwriting recognition model to generate text of the handwritten information; and
    storing the text of the handwritten information as data associated with the genealogical record in a genealogical database.

2. The computer-implemented method of claim 1, further comprising generating a confidence score for the text predicted by the handwriting recognition model.

3. The computer-implemented method of claim 2, wherein the confidence score is generated by an audit model, and wherein the audit model is trained together with the handwriting recognition model.

4. The computer-implemented method of claim 3, wherein the audit model is configured to receive a plurality of image features from different layers of the handwriting recognition model and generate the confidence score based on the plurality of image features.

5. The computer-implemented method of claim 1, wherein dividing the genealogical record into a plurality of areas comprises:
    identifying a first set of keypoints in the genealogical record;
    comparing the first set of keypoints to a second set of keypoints in a template record having template area coordinates;
    generating a transform based on the first and second set of keypoints; and
    generating divided area coordinates by applying the transform to the template area coordinates in the template record.

6. The computer-implemented method of claim 5, wherein identifying the first set of keypoints in the genealogical record comprises comparing segments of the image of the genealogical record to segments of the template record, and the segments comprise corners but not a center.

7. The computer-implemented method of claim 1, wherein the type of the field in the particular area includes a name field, and the handwriting recognition model comprises convolution layers, a transformer encoder and a transformer decoder.

8. The computer-implemented method of claim 1, wherein the type of the field in the particular area includes a checkbox field, and the handwriting recognition model comprises convolution layers that is configured to identify a checkbox and a binary classifier that is configured to determine whether the checkbox is checked.

9. The computer-implemented method of claim 1, wherein the type of the field in the particular area includes a machine labeled field, and the handwriting recognition model comprises a field prior that provides information related to machine-printed labels in the machine labeled field.

10. The computer-implemented method of claim 1, wherein the handwriting recognition model comprises:
    a convolutional neural network backbone that is configured to identify image features of the image;
    a sequence engine that includes a bi-directional long short-term memory network that is configured to use the image features to generate a sequence prediction; and
    a decoder that is configured to generate the sequence prediction to a text prediction.

11. The computer-implemented method of claim 1, wherein generating the text of the handwritten information by the handwriting recognition model comprises:
    dividing a handwritten area into multiple spatial regions;
    identifying a character in each spatial region;
    generating a string of characters based on the character identified in each spatial region; and
    generating a text prediction based on the string of characters.

12. The computer-implemented method of claim 1, wherein the handwritten information comprises a first collection of handwriting written in a first direction and a second collection of handwriting written in a second direction, and the handwriting recognition model is configured to rotate the second collection of handwriting written in the second direction.

13. The computer-implemented method of claim 1, wherein the genealogical record is part of a historical collection that has a recurring layout, and the structured layout is part of the recurring layout.

14. A system comprising:
one or more processors; and
memory coupled to the one or more processors, the memory configured to store computer code comprising instructions, wherein the instructions, when executed by the one or more processors, cause the one or more processors to perform steps comprising:
receiving a genealogical record, the genealogical record being an image of a physical form having a structured layout and a plurality of fields, the physical form having handwritten information;
dividing the genealogical record into a plurality of areas based on the structured layout;
identifying, for a particular area, a type of a field that is included within the particular area;
selecting, from a set of candidate handwriting recognition models, a handwriting recognition model for identifying the handwritten information in the particular area, the handwriting recognition model selected based on the type of the field included within the particular area;
inputting an image of the particular area to the handwriting recognition model to generate text of the handwritten information; and
storing the text of the handwritten information as data associated with the genealogical record in a genealogical database.

15. The system of claim 14, wherein the steps further comprise generating a confidence score for the text predicted by the handwriting recognition model.

16. The system of claim 14, wherein dividing the genealogical record into a plurality of areas comprises:
identifying a first set of keypoints in the genealogical record;
comparing the first set of keypoints to a second set of keypoints in a template record having template area coordinates;
generating a transform based on the first and second set of keypoints; and
generating divided area coordinates by applying the transform to the template area coordinates in the template record.

17. The system of claim 14, wherein the type of the field in the particular area includes a name field, and the handwriting recognition model comprises convolution layers, a transformer encoder and a transformer decoder.

18. The system of claim 14, wherein the type of the field in the particular area includes a checkbox field, and the handwriting recognition model comprises convolution layers that is configured to identify a checkbox and a binary classifier that is configured to determine whether the checkbox is checked.

19. The system of claim 14, wherein the handwriting recognition model comprises:
a convolutional neural network backbone that is configured to identify image features of the image;
a sequence engine that includes a bi-directional long short-term memory network that is configured to use the image features to generate a sequence prediction; and
a decoder that is configured to generate the sequence prediction to a text prediction.

20. A non-transitory computer-readable medium configured to store computer code comprising instructions, wherein the instructions, when executed by one or more processors, cause the one or more processors to perform steps comprising:
receiving a genealogical record, the genealogical record being an image of a physical form having a structured layout and a plurality of fields, the physical form having handwritten information;
dividing the genealogical record into a plurality of areas based on the structured layout;
identifying, for a particular area, a type of a field that is included within the particular area;
selecting, from a set of candidate handwriting recognition models, a handwriting recognition model for identifying the handwritten information in the particular area, the handwriting recognition model selected based on the type of the field included within the particular area;
inputting an image of the particular area to the handwriting recognition model to generate text of the handwritten information; and
storing the text of the handwritten information as data associated with the genealogical record in a genealogical database.

\* \* \* \* \*